(12) United States Patent
Miller et al.

(10) Patent No.: US 12,015,435 B2
(45) Date of Patent: Jun. 18, 2024

(54) BIKE LOCK AS COMMUNICATION HUB FOR AN ELECTRIC BICYCLE

(71) Applicant: Rad Power Bikes Inc., Seattle, WA (US)

(72) Inventors: Dave Miller, Seattle, WA (US); Jake Silsby, Seattle, WA (US); Bryan Ford, Seattle, WA (US); Redwood Stephens, Seattle, WA (US)

(73) Assignee: Rad Power Bikes Inc., Seattle, WA (US)

( * ) Notice: Subject to any disclaimer, the term of this patent is extended or adjusted under 35 U.S.C. 154(b) by 560 days.

(21) Appl. No.: 17/217,901

(22) Filed: Mar. 30, 2021

(65) Prior Publication Data

US 2022/0306226 A1    Sep. 29, 2022

Related U.S. Application Data

(63) Continuation of application No. 17/216,440, filed on Mar. 29, 2021.

(51) Int. Cl.
*H04W 4/80*    (2018.01)
*B60R 25/04*   (2013.01)
(Continued)

(52) U.S. Cl.
CPC ........... *H04B 1/3822* (2013.01); *B60R 25/04* (2013.01); *B60R 25/102* (2013.01); *B60R 25/24* (2013.01); *B60R 25/33* (2013.01); *B62H 5/08* (2013.01); *B62H 5/14* (2013.01); *B62J 7/04* (2013.01); *B62J 11/00* (2013.01); *B62J 43/13* (2020.02); *B62J 45/20* (2020.02); *B62J 50/20* (2020.02); *B62J 50/22* (2020.02); *B62K 11/00* (2013.01); *B62M 6/45* (2013.01);
(Continued)

(58) Field of Classification Search
CPC . B62H 5/14; B62J 45/20; B62J 50/20; H04W 4/48; E05B 71/00
See application file for complete search history.

(56) References Cited

U.S. PATENT DOCUMENTS 5,823,027 A * 10/1998 Glick ................. G07C 9/00904
                                                  70/263
2012/0146429 A1* 6/2012 Seol ......................... B62M 6/90
                                                  307/116
(Continued)

FOREIGN PATENT DOCUMENTS

EP          3680865 A1      7/2020
KR        10-1839110 B1     3/2018
(Continued)

OTHER PUBLICATIONS

International Search Report and Written Opinion dated Sep. 2, 2022 for related International Application No. PCT/US2022/021739.

*Primary Examiner* — Dalena Tran
(74) *Attorney, Agent, or Firm* — AMPACC Law Group, PLLC

(57) ABSTRACT

Various embodiments provide for a bike-supported communication network that manages and facilitates communications between components of an electric bicycle and a wireless network. In some embodiments, the systems and methods provide a bike-supported communication device that is integrated into a bike lock, lock, or lock assembly.

20 Claims, 17 Drawing Sheets

(51) Int. Cl.

| | | |
|---|---|---|
| *B60R 25/102* | (2013.01) | |
| *B60R 25/24* | (2013.01) | |
| *B60R 25/33* | (2013.01) | |
| *B62H 5/08* | (2006.01) | |
| *B62H 5/14* | (2006.01) | |
| *B62J 7/04* | (2006.01) | |
| *B62J 11/00* | (2020.01) | |
| *B62J 43/13* | (2020.01) | |
| *B62J 45/20* | (2020.01) | |
| *B62J 50/20* | (2020.01) | |
| *B62J 50/22* | (2020.01) | |
| *B62K 11/00* | (2006.01) | |
| *B62M 6/45* | (2010.01) | |
| *G07F 17/00* | (2006.01) | |
| *H04B 1/3822* | (2015.01) | |
| *H04W 4/40* | (2018.01) | |
| *H04W 4/48* | (2018.01) | |
| *B60R 25/10* | (2013.01) | |
| *B62M 6/90* | (2010.01) | |
| *E05B 71/00* | (2006.01) | |
| *E05B 73/00* | (2006.01) | |
| *G16Y 10/40* | (2020.01) | |
| *G16Y 10/75* | (2020.01) | |
| *G16Y 40/50* | (2020.01) | |
| *H04W 84/12* | (2009.01) | |

(52) U.S. Cl.
CPC .......... *G07F 17/0057* (2013.01); *H04W 4/40* (2018.02); *H04W 4/48* (2018.02); *H04W 4/80* (2018.02); *B60R 2025/1016* (2013.01); *B60R 2325/105* (2013.01); *B62K 2204/00* (2013.01); *B62M 6/90* (2013.01); *E05B 71/00* (2013.01); *E05B 73/0005* (2013.01); *G16Y 10/40* (2020.01); *G16Y 10/75* (2020.01); *G16Y 40/50* (2020.01); *H04W 84/12* (2013.01)

(56) References Cited

U.S. PATENT DOCUMENTS

2014/0123483 A1* 5/2014 Wilsey .................. B62M 25/08
 29/745
2020/0361552 A1 11/2020 Radenbaugh
2021/0221464 A1* 7/2021 Ølmheim ................ B62J 45/41

FOREIGN PATENT DOCUMENTS

KR 20200009267 A 1/2020
WO 2017188824 A1 11/2017

* cited by examiner

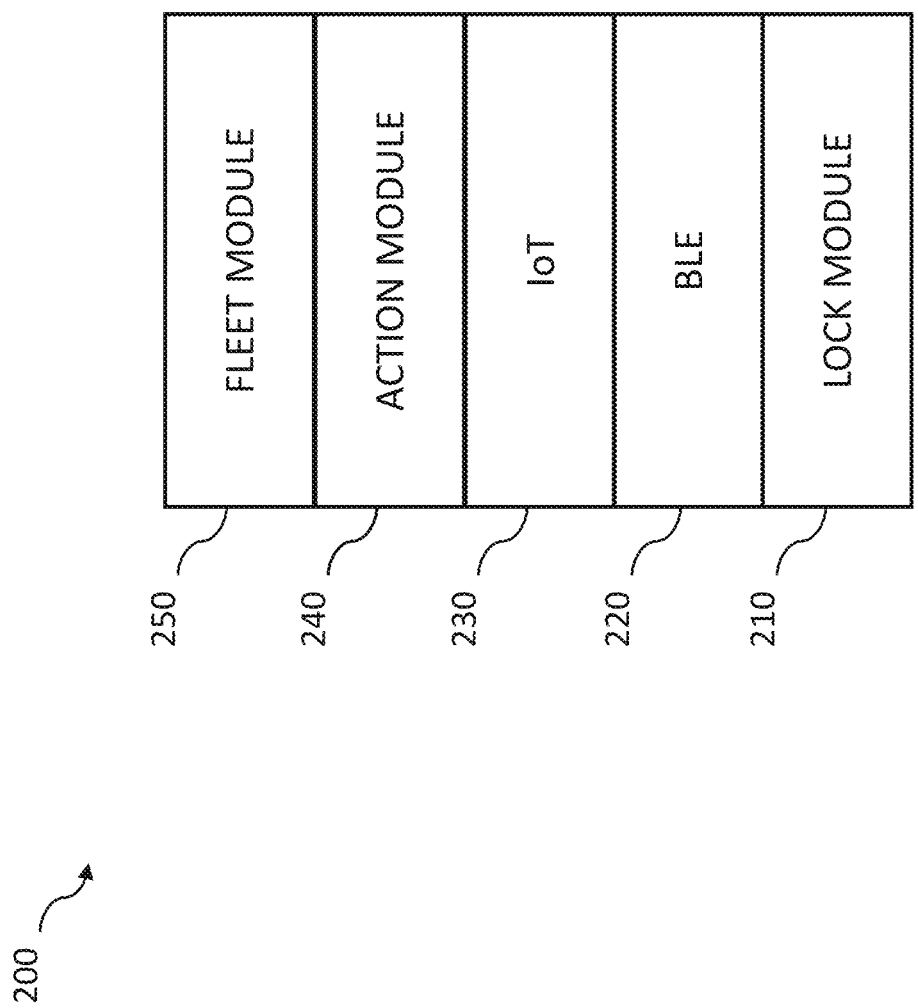

BIKE LOCK AS COMMUNICATION HUB FOR AN ELECTRIC BICYCLE

CROSS REFERENCE TO RELATED APPLICATIONS

This application is a continuation of U.S. patent application Ser. No. 17/216,440, filed Mar. 29, 2021, and is related to U.S. patent application Ser. No. 16/875,874, filed on May 15, 2020, entitled BICYCLE SECURITY DEVICES AND SYSTEM, the contents of which are hereby incorporated by reference in their entirety.

BACKGROUND

Electric bicycles, or e-bikes, are a popular method of transportation for use by individual riders, families, commercial enterprises, and so on. Generally, electric bicycles are more expensive than traditional bicycles, and thus enhanced security devices and anti-theft systems that assist with or prevent unauthorized and/or unwanted use of an electric bicycle, such as its theft, are desirable.

While conventional security devices, such as locks (e.g., cables, chains, D-locks U-locks, wheel locks) or alert systems, can provide varying levels of deterrence or prevention, thieves can still find ways to remove the locks or avoid the alert systems. For example, thieves have a myriad amount of lock removal tools at their disposal, such as lock picks, cable cutters, hacksaws, bolt cutters, drills, grinders, and so on.

Further, conventional alert systems can be expensive and/or suffer from various issues. For example, conventional systems can present false alerts upon detecting bike movements due to accidental or innocuous activities (e.g., and not due to a theft or other illegal activities). Further, such systems may detect the theft of a bicycle when it is too late (e.g., once the thief has already removed the lock and is riding away with the bike), and thus not be useful for deterrence of the theft or recovery of the bike.

These and other drawbacks exist with respect to conventional locks and alert systems.

BRIEF DESCRIPTION OF THE DRAWINGS

Embodiments of the present technology will be described and explained through the use of the accompanying drawings.

FIG. 2A is a block diagram illustrating various modules of a modular lock assembly.

Figure 1A:
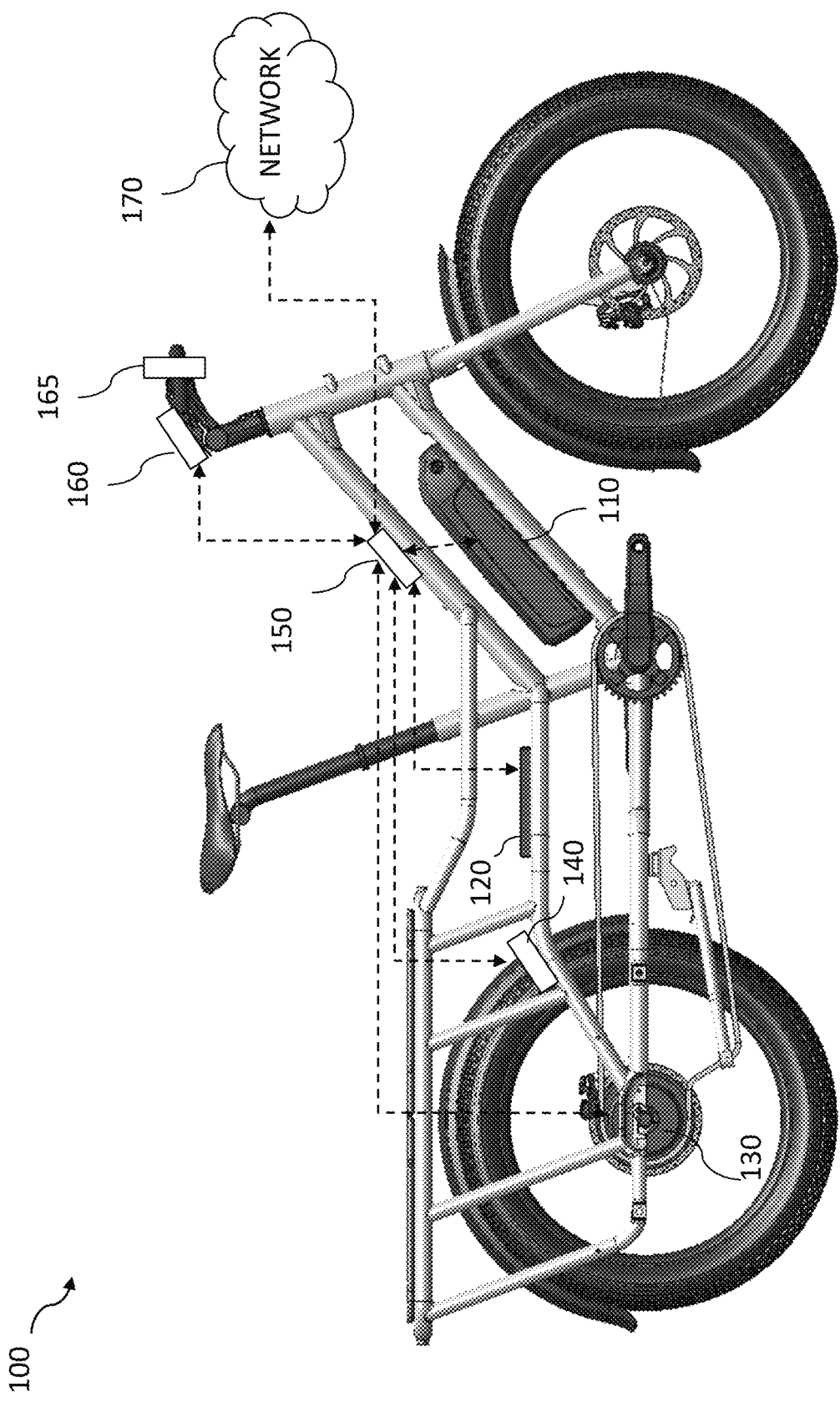
FIG. 1A is a diagram illustrating a network of components for an electric bicycle.

In the drawings, some components are not drawn to scale, and some components and/or operations can be separated into different blocks or combined into a single block for discussion of some of the implementations of the present technology. Moreover, while the technology is amenable to various modifications and alternative forms, specific implementations have been shown by way of example in the drawings and are described in detail below. The intention, however, is not to limit the technology to the particular implementations described. On the contrary, the technology is intended to cover all modifications, equivalents, and alternatives falling within the scope of the technology as defined by the appended claims.

DETAILED DESCRIPTION

Overview

Various systems and methods associated with securing electric bicycles and alerting users of theft or tampering activities associated with their electric bicycles are described. For example, the systems and methods described herein are configured or implemented to act as anti-theft or anti-tampering devices for an electric bicycle.

Various embodiments provide for a bike-supported communication network that manages and facilitates communications between components of an electric bicycle and a wireless network. In some embodiments, the systems and methods provide a bike-supported communication device that communicates with a wireless network via one or more wireless communication protocols, where the communication device is configured to manage communications between the wireless network and various components of the electric bicycle. The communication device can include a bicycle communications component that facilitates communications between the communication device and components of the electric bicycle, and a network communications component that facilitates communications between the electric bicycle and the wireless network.

While described herein with respect to electric bicycles, in some embodiments aspects of the security devices and systems described herein can be configured or utilized with other bicycles or cycles, such as non-electric bicycles, tricycles, scooters or other wheeled micro-mobility vehicles, mopeds, and so on.

Various embodiments of the devices and systems will now be described. The following description provides specific details for a thorough understanding and an enabling description of these embodiments. One skilled in the art will understand, however, that these embodiments may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments.

Examples of Electric Bicycle Networks and Suitable Communication Environments

FIG. 1A depicts an electric bicycle 100 that incorporates many of the various features of the technology described herein. As depicted, the electric bicycle, or e-bike, is a long-tail cargo bike configured to be propelled either by human pedaling of the e-bike and/or via an electric motor that assists the human's pedal-power or propels the e-bike without pedaling (similar to a moped or scooter). Of course, the electric bicycle 100 can be of various other types or styles, including different classes of bikes (e.g., class 1, 2, or 3 e-bike), electric bikes having different frames (e.g., road bikes, commuter bikes, folding bikes), and so on.

Electric Bicycle Communication Networks

The electric bicycle 100 includes components common to bicycles, such as a front wheel and rear wheel that support a frame of the bicycle, a crankset (that supports pedals, not shown), a chain that extends from the crankset to a rear axle of the rear wheel, a seat, handlebars, cargo rack, and so on. The frame can include a head tube, a down tube, a top tube and a seat tube, as well as seat stays or other cross tubes. The front wheel can be attached to the frame via a fork connected to the head tube, and the rear wheel can be attached to the frame via a dropout assembly of the frame.

The electric bicycle 100 also includes a battery pack 110 positioned and/or mounted to a down tube of the frame, a controller 120 mounted to seat-stays of the frame, and an electric motor 130 (e.g., a hub motor) mounted to the rear wheel. In some cases, the battery pack 110 and/or controller 120 can be integrated or semi-integrated into the frame of the electric bicycle 100. During operation of the electric bicycle 100, the battery pack 110 provides power to the electric motor 130, which propels the bicycle under control of the controller 120. In some configurations, the battery pack 110 and/or controller 120 are mounted to other components of the frame.

Further, the electric bicycle 100 includes an integrated security device 140, as described herein. The integrated security device 140 can include a cable or tether lock component integrated with a wheel lock (having a sliding or rotating shackle), which enables a rider to secure his/her bicycle via one or two integrated mechanisms of deterrence or protection housed within the bike lock.

In order to communicate with a network 170, the electric bicycle 100 includes a communication device 150, such as a wireless communication device that is configured to communicate over a wireless network, such as a cellular network. The communication device 150 can include components configured to communicate over the network 170, such as WiFi components, cellular components (e.g., 4G or 5G cellular components), Bluetooth components, and so on. For example, the communication device 150 can include various embedded sensors, processors (microprocessors), and connectivity ports or antennas. In some cases, the communication device 150 functions as an Internet of Things (IoT) device and can enable the electric bicycle 100 to be part of a network of connected e-bikes, such as a fleet of electric bicycles in communication with a central server or portal.

As described herein, the communication device 150 provides one or more communication methods, protocols, systems and/or devices, such as cellular communication technologies, Bluetooth® communication technologies, Near-Field Communication (NFC) technologies, Radio Frequency Identification (RFID) communication technologies, GSM/GPRS, and so on. These technologies can communicate via various communication protocols, such as HTTP, MQTT (Message Queueing Telemetry Transport), AMQP (Advanced Message Queueing Protocol), and so on.

Thus, the communication device 150 can include various combinations of communication technologies, in order to establish or support an electric bicycle network. Example combinations include:

a Bluetooth component that facilitates Bluetooth protocol communications between the communication device and a controller, battery pack, and/or electric motor, and a wireless component that facilitates WiFi protocol communications between the communication device and the wireless network;

a Bluetooth component that facilitates Bluetooth protocol communications between a communication device and the controller, battery pack, and/or electric motor, and a cellular component that facilitates cellular protocol communications between the communication device and the wireless network;

a bicycle communications component that facilitates communications between the communication device and a controller, a battery pack, and/or an electric motor of the electric bicycle, and a network communications component that facilitates communications between the electric bicycle and the wireless network; and so on.

As described herein, the communication device 150, in some cases, acts a communications hub for the electric bicycle, and can perform various operations or methods as the communications hub. For example, the communication device 150 can perform a method of facilitating communications between components of an electric bicycle by receiving, via a bicycle communications component of the communications device, information associated with a current operation of a component of the electric bicycle from a controller of the electric bicycle, and transmitting, via a network communications component of the communication device, a message to a fleet management server that is remote from the electric bicycle over a wireless network, where the message includes the information associated with the current operation of the component of the electric bicycle.

The communication device 150 can then receive, at the network communications component of the communication device, a reply message from the fleet management server over the wireless network, and send, via the bicycle communications component, a control signal to the component of the electric bicycle to control the current operation of the component of the electric bicycle in response to the reply message received from the fleet management server.

In some cases, the communication device 150 is disposed within an internal area of the frame of the electric bicycle, such as within an internal area of a top tube of the electric bicycle, an internal area of a down tube of the electric bicycle, or other internal areas within the bicycle frame.

The electric bicycle 100 can also include a display device 160, which is configured to receive input from a rider of the bicycle 100 and/or present information to the rider of the bicycle. For example, the display device 160 can present information associated with a current ride or trip (e.g., speed, pedal assist level, battery level, route, and so on), information associated with communications by the communication device 150 over the network 170, and so on. The display device 160 can also facilitate receiving input from the rider, such as input to adjust the pedal assist level or to communicate information over the network 170).

In some cases, the electric bicycle 100 can include a smart or connected mount or mounting device 165 that communicates with other components of the bicycle 100. The mount 165 can pair with a mounted or attached device, such as a smart phone or mobile device. For example, when a paired device is attached, the mount can send information to the controller 120 or communication device 150 that includes information identified the paired device and/or the associated user.

Thus, in some embodiments, the electric bicycle 100 provides a bike supported network of various communication components, such as components configured to trigger alerts and/or alarms associated with unauthorized movement or use of the bicycle 100, as well as components configured to perform other communication functions, as described herein. In some cases, the bike supported network includes the control device or controller 120 that controls functions of the electric battery 110 and/or the hub motor 130.

The controller 120 can also communicate with the display device 160, which can present information to riders, as well as receive input from riders of the bicycle 100. In some cases, the controller 120 can determine rider input power, and send such information to the network 170 and/or various components. The controller 120 can also communicate with the security device 140, which can include various components configured to interact with the controller 120. Further, any or all components can communicate with the communication device 150 or with other components via the communication device 150.

In addition to the components depicted in FIG. 1A, the electric bicycle can include other components not shown, such as pedals, pedal assist sensors, throttles, torque sensors and other bike or component movement sensors, brakes and braking systems, various accessories, fenders, various types of rims, tires, or wheels, locking or security systems, lights and reflectors, bells or other audible alert systems, GPS, screens, and/or other user interfaces or display devices, and so on.

FIG. 1A and the components, systems, servers, and devices depicted herein provide a general computing environment and network within which the technology described herein can be implemented. Further, the systems, methods, and techniques introduced here can be implemented as special-purpose hardware (for example, circuitry), as programmable circuitry appropriately programmed with software and/or firmware, or as a combination of special-purpose and programmable circuitry. Hence, implementations can include a machine-readable medium having stored thereon instructions which can be used to program a computer (or other electronic devices) to perform a process. The machine-readable medium can include, but is not limited to, floppy diskettes, optical discs, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other types of media/machine-readable medium suitable for storing electronic instructions.

The network or cloud 170 can be any network, ranging from a wired or wireless local area network (LAN), to a wired or wireless wide area network (WAN), to the Internet or some other public or private network, to a cellular (e.g., 4G, LTE, or 5G network), and so on. While the connections between the various devices and the network 170 and are shown as separate connections, these connections can be any kind of local, wide area, wired, or wireless network, public or private.

Further, any or all components depicted in the Figures described herein can be supported and/or implemented via one or more computing systems or servers. Although not required, aspects of the various components or systems are described in the general context of computer-executable instructions, such as routines executed by a general-purpose computer, e.g., mobile device, a server computer, or personal computer. The system can be practiced with other communications, data processing, or computer system configurations, including: Internet appliances, hand-held devices (including tablet computers and/or personal digital assistants (PDAs)), all manner of cellular or mobile phones, multi-processor systems, microprocessor-based or programmable consumer electronics, set-top boxes, network PCs, mini-computers, mainframe computers, AR/VR devices, and the like. Indeed, the terms "computer," "host," and "host computer," and "mobile device" and "handset" are generally used interchangeably herein and refer to any of the above devices and systems, as well as any data processor.

Aspects of the system can be embodied in a special purpose computing device or data processor that is specifically programmed, configured, or constructed to perform one or more of the computer-executable instructions explained in detail herein. Aspects of the system may also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices.

Aspects of the system may be stored or distributed on computer-readable media (e.g., physical and/or tangible non-transitory computer-readable storage media), including magnetically or optically readable computer discs, hard-wired or preprogrammed chips (e.g., EEPROM semiconductor chips), nanotechnology memory, or other data storage media. Indeed, computer implemented instructions, data structures, screen displays, and other data under aspects of the system may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme). Portions of the system may reside on a server computer, while corresponding portions may reside on a client computer such as a mobile or portable device, and thus, while certain hardware platforms are described herein, aspects of the system are equally applicable to nodes on a network. In an alternative embodiment, the mobile device or portable device may represent the server portion, while the server may represent the client portion.

Lock as a Hub in an Electric Bicycle Network

Figure 1B:
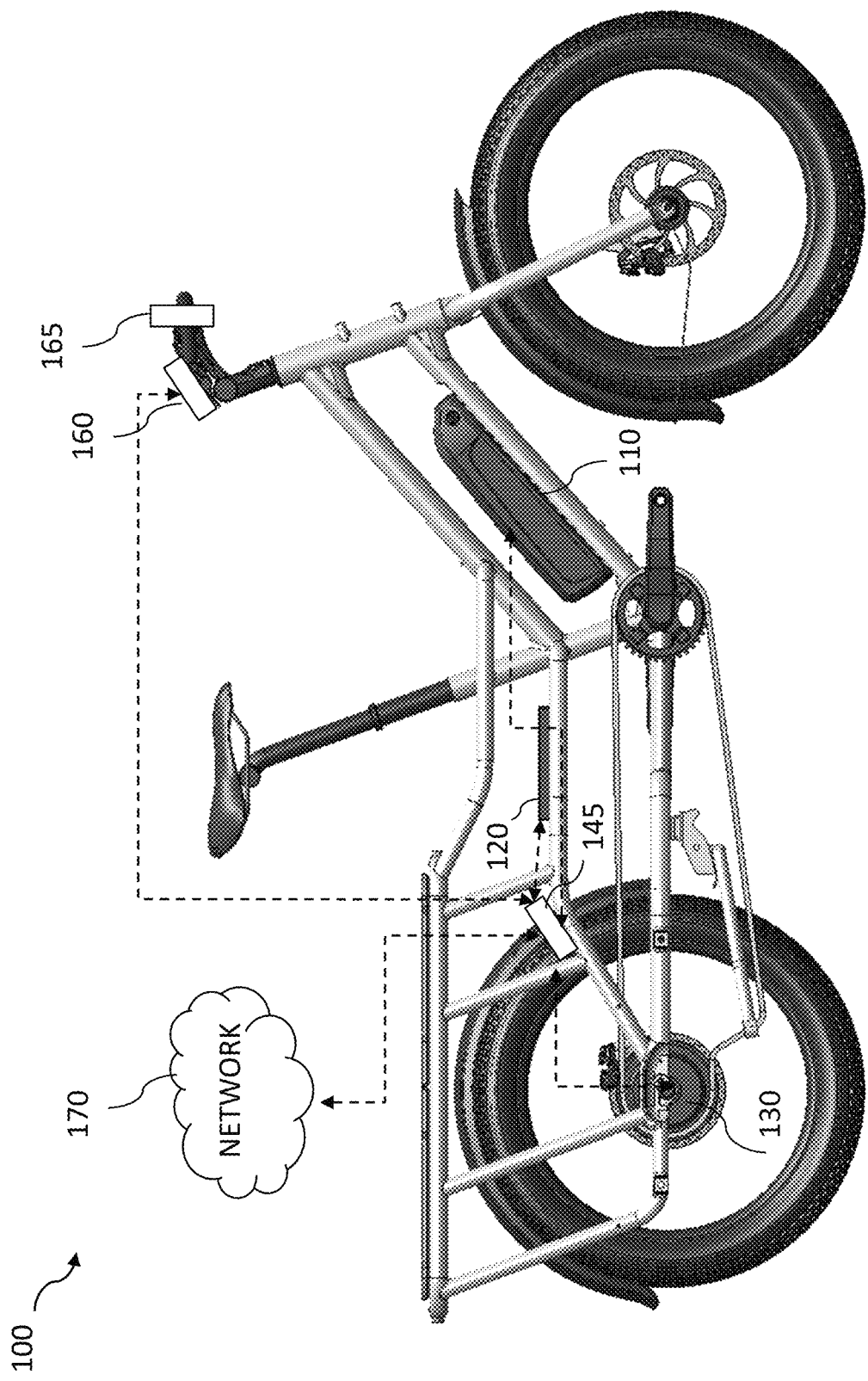
FIG. 1B is a diagram illustrating a lock as a hub within an electric bicycle network.

In some embodiments, the security device 140 can incorporate or include some or all aspects of the communication device 150. FIG. 1B is a diagram illustrating a lock 145, lock assembly, or security device as a hub of an electric bicycle network. The lock 145 acts as a communication hub for the electric bicycle 100, where some or all other components of the bicycle 100 communicate with other components via the lock 145.

As described herein, the lock 145 includes various components that lock, protect, or secure the electric bicycle 100.

A lock component can include a mechanically-actuated shackle lock that prevents the rear wheel of the electric bicycle from rotating, an electronically-actuated shackle lock that prevents the rear wheel of the electric bicycle from rotating, an integrated cable lock that is configured to fix the electric bicycle to a fixture at a geographical location that includes the electric bicycle, an electronic locking module that causes the electric motor, the battery park, and/or the controller to operate in a locked mode of operation, and so on.

Further, the lock 145 includes components configured to communicate over the network 170, such as WiFi components, cellular communication components, Bluetooth components, and so on. The lock 145, therefore, can enable the electric bicycle 100 to be an Internet of Things (IoT) device that communicates with a central server or portal over the network 170.

For example, a lock assembly can include a communication device, such as the communication device 150, that communicates with a wireless network via one or more wireless communication protocols, where the communication device is configured to manage communications between the wireless network and the controller of the electric bicycle.

The lock assembly, therefore, can perform various actions, operations, or methods acting as a communication hub for the electric bicycle 100. For example, the lock 145 can receive information associated with a current operation of a component of the electric bicycle over a Bluetooth communication protocol that manages communications between the communications device and the component of the electric bicycle, and transmit a message to a bicycle management server that is remote from the electric bicycle over a wireless network, where the message includes the information associated with the current operation of the component of the electric bicycle.

Establishing the lock 145 as the communication hub for the electric bicycle 100 protects the communication components from tampering or destruction, because the lock 145 is already designed and configured to be securely attached to the bicycle 100 (and to secure the bicycle when not in use). Thus, the lock 145 provides a protected housing or compartment in which to support or dispose of various communication or computing components, in order to protect these components from theft, tampering, damage, and/or provide other benefits.

Examples of a Modular Lock Assembly

In some cases, the lock 145 as hub can be configured as a modular device, where the lock 145 includes two or more modules selected to perform or provide certain functions for the electric bicycle 100, the rider of the electric bicycle 100, the fleet within which the bicycle 100 is provided, and so on. FIG. 2A is a block diagram illustrating various modules of a modular lock assembly 200.

The modular lock assembly 200, which can be implemented by the lock 145 and or the security device 140, includes various modules that can be provided or removed, depending on the capabilities, functions, or services to provide to the bicycle 100, the rider, the associated fleet, the provider of the bicycle 100 (e.g., a bike share service) and so on.

The lock assembly 200 includes a lock module 210, such as physical lock that prevents the rear wheel from moving (e.g., a shackle lock), a physical lock that fixes the bicycle 100 to a structure (e.g., a cord lock), an electronic lock that prevents various bicycle components from operating (e.g., wheels, handlebars or fork, motor, battery, controller) and so on. In some cases, as described herein, the lock module 210 can attach to or be integrated with a conventional lock already fixed to the bicycle 100 and control the operation (e.g., opening and closing) of the conventional lock, without having to remove and provide a new locking mechanism.

The lock assembly 200 also includes a communication module, such as a Bluetooth module 220 and/or IoT module 230. The communication module, which can include one or more communication transmitters/receivers, enables the lock assembly 200 to communicate over different communication protocols, such as Bluetooth, wireless (WiFi), cellular, and so on.

For example, the Bluetooth module 220 can facilitate and support communications between the lock assembly 200 and an associated mobile device (e.g., the mobile device of a rider of the bicycle 100) or other components of the bicycle 100. The IoT module 230 can facilitate and support communications between the lock assembly 200 and various remote servers or portals over a communications network, such as the network 170. Thus, the IoT module 230 can represent the electric bicycle 100 as an Internet of Things (IoT) device on the communications network.

The lock assembly 200 can also include an action module 240, which is configured and/or programmed to perform various actions associated with the electric bicycle 100, such as actions associated with preventing or resisting theft or tampering events at the electric bicycle 100. For example, the action module 200 can control and/or trigger the performance of alerts or alarms in response to certain events, and/or can modify operations of other components of the electric bicycle 100 during certain unwanted events or conditions. Further details regarding the components of the action module 240 and/or actions performed by the action module 240 are described herein.

As described herein, in some embodiments, the electric bicycle 100 can be part of a network of connected electric bicycles, such as a fleet of electric bicycles, a ride share service for a city or location, and so on. In order to facilitate or protect communications between the electric bicycle 100 and fleet management servers or systems, the lock assembly 200 can include a fleet module 250 that is configured to communicate information directly with the fleet management servers of systems.

For example, the fleet module 250 can be configured by the provider of the fleet of bicycles (e.g., a delivery company using electric bicycles to make deliveries, a ride share service, a university, and so on), and can capture, track, and/or store certain information associated with the use or activities of the electric bicycle 100. Such information can be provided to the fleet management server or system upon request or at various established time periods.

Further, the fleet management server or system can transfer information or updates to the lock assembly 200 in order to update various database or operating parameters of the electric bicycle 100. Thus, the lock assembly 200 can provide a secure and tamper-proof location within which to store fleet specific information and/or track use/activity information for a fleet-provided bicycle, among other benefits.

Examples of Integrated Locking/Unlocking

In some cases, the electric bicycle 100 can include a device mount (e.g., smart phone or mobile device mount) that integrates the charging of a mounted device with the unlocking of the lock 140, 145, 200 (or other components) of the electric bicycle 100. In some cases, a mount, similar to a mount for the display device 160, can communicate over the bike supported network when paired with a mobile device associated with the mount (or the bicycle 100).

Figure 2B:
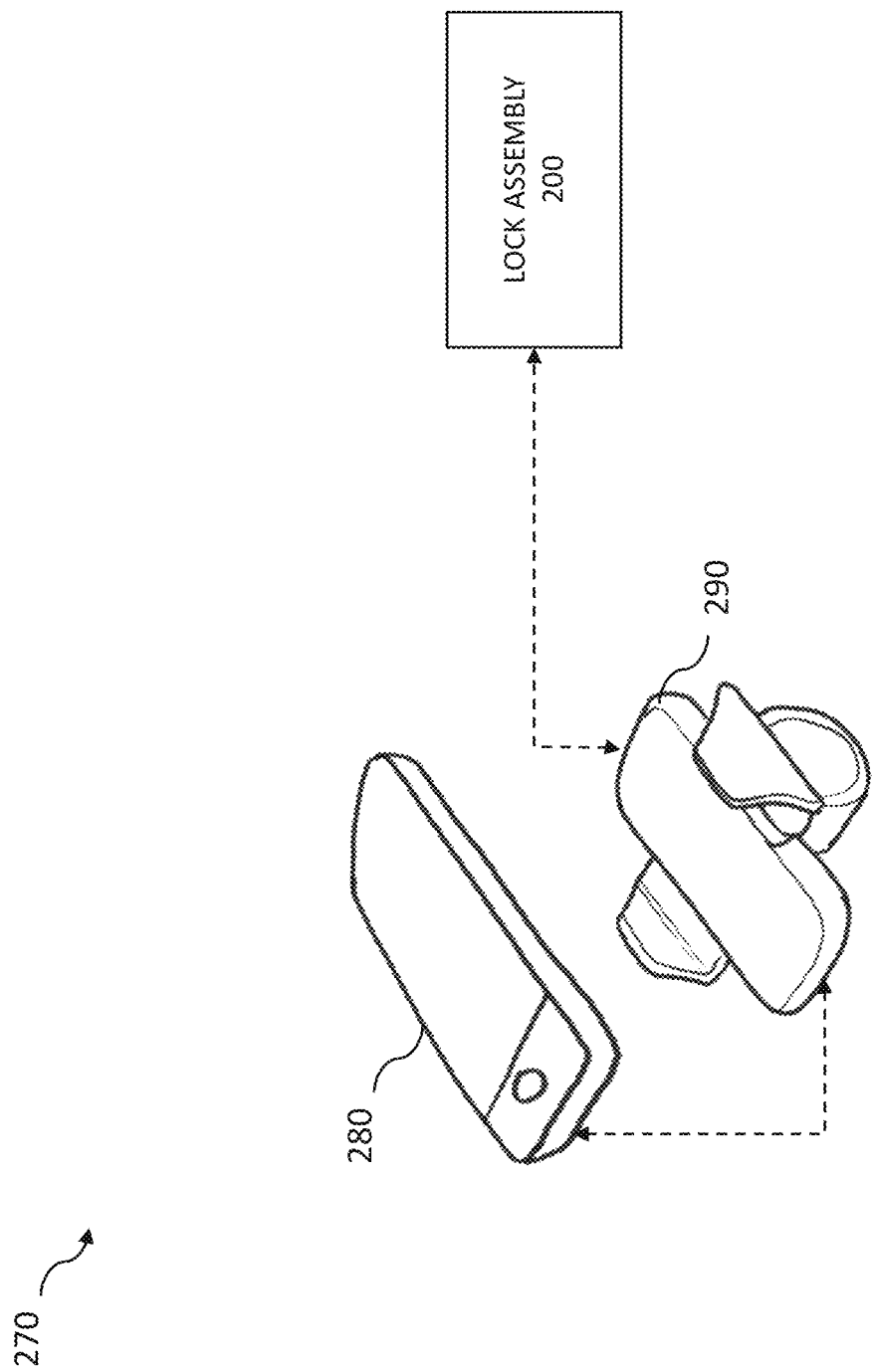
FIG. 2B is a diagram illustrating a device mount in communication with an electric bicycle network.

FIG. 2B depicts a mobile device 280 and associated mount 290. When the mobile device 280, such as a device associated with the electric bicycle 100, is mounted to the bicycle 100 via the mount 290, the mount sends a signal via the bike supported network or other communication protocols (e.g., Bluetooth) to the lock 200. The signal indicates the mobile device is associated with an authorized rider of the bicycle, and the lock 200 unlocks upon receiving the signal. Similarly, when the device is removed, the lock 200 may then lock to secure the bicycle 100.

The mount 290 can include various components that identify the mobile device 280 is associated with the electric bicycle 100 or is otherwise associated with an authorized user of the electric bicycle 100 (e.g., is the device of one or more users of bicycles provided by a fleet or bike share service). For example, the mount 290 can communicate with the mobile device 280 over Bluetooth or other similar protocols or can identify the device 280 via the bike-supported network.

In some cases, the mount 290 can determine the device 280 is in contact or proximate to the mount 290 (e.g., is mounted or attached), and control access to the electric bicycle 100 (e.g., unlocking the lock, enabling the controller 120 and/or motor 130 to operate, and so on). For example, the mobile device 280 can communicate over RFID or NFC (near field communication) with the mount 290, which receives identification information from the device 280, and performs actions to unlock the lock 200 or enable other controls of the electric bicycle 100, as described herein.

Thus, the mount 290, or an associate system, can receive an identifier from the mobile device over a near field communications (NFC) protocol or an RFID protocol when the mobile device contacts or is proximate to the mount, and determine the identifier is associated with a user authorized to operate the electric bicycle.

Further, the mount can send signals via the bike supported network or other communication protocols to the other components (e.g., the controller 120, motor 130, battery 110, display device 160, and so on) of the bicycle 100. Thus, these components may only operate, or may operate with limited functionality, in response to the mount sending the signal that the mobile device 280 is attached or otherwise paired with the mount 290.

The mount 290, or a system associated with the mount 290, can perform a method for securing an electric bicycle by determining that a mobile device associated with the electric bicycle is in contact with a mount disposed on the electric bicycle, and causing a lock assembly to unlock the electric bicycle in response to the determination that the mobile device is in contact with the mount.

Then, in some cases, the mount 290 or associated system can determine that a mobile device associated with the electric bicycle is no longer in contact with the mount disposed on the electric bicycle and cause the lock assembly to lock the electric bicycle in response to the determination that the mobile device no longer contacts the mount. In some cases, the mount 290 or associated system locks (or relocks) the bicycle when it is no longer moving, in order avoid locking the bicycle when it is in motion (and the rider uses their device).

Thus, the device mount 290 can be part of a system that manages operations of an electric bicycle, which includes the device mount 290 that determines a mobile device associated with the electric bicycle is attached, and controller that controls operations of the electric bicycle in response to receiving a signal from the device mount that the mobile device attached to the device mount is associated with an authorized user of the electric bicycle.

Electric Bicycle on a Network

Figure 3:
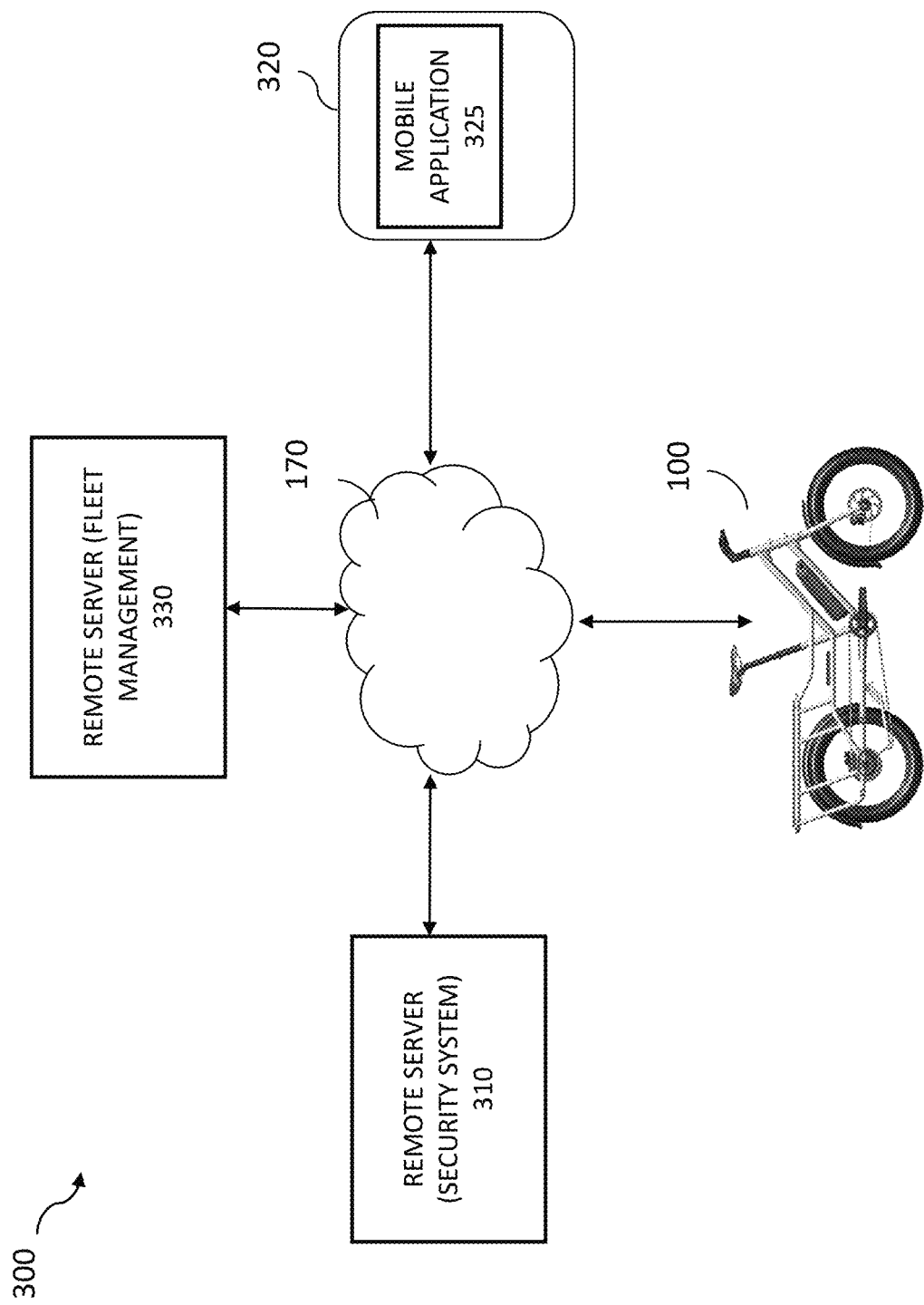
FIG. 3 is a block diagram illustrating a suitable network environment within which an electric bicycle operates.

As described herein, the electric bicycle 100 operates on or within a network, such as the network 170. FIG. 3 is a block diagram illustrating a suitable network environment 300 within which the electric bicycle 100 operates or communicates with remote servers/systems, other bicycles, road or bike path traffic devices, and so on.

The bicycle 100, as described herein, can send information to, and receive information from, other devices over the communications network 170, such as a security server 310, a mobile device 320 having a mobile application 325 associated with the bicycle 100, a remote server 330, and so on. Thus, the bicycle 100, via the various communication devices, can act as an IoT device or other communication device on the network 170.

For example, the remote server 330 can communicate with the electric bicycle 100 over the network 170 via the modular lock assembly 200, the lock 145, and/or the communication device 150 of a bike supported network. Further, the electric bicycle 100 can communicate, via the action module 240, alert or alarm information to the remote server 330 of a fleet management system, the remote server 310 of a security system, and/or the mobile application 325 of the mobile device 320 (e.g., the smart phone of the rider of the bicycle 100).

Examples of a Bike Communication System

As described herein, in some embodiments, the electric bicycle 100 can include or support a bicycle network of components, such as a network that facilitates communication between various components of the electric bicycle 100 and remote servers (e.g., remote servers 310, 330 over the network 170).

In such embodiments, the electric bicycle 100 supports a bike communication system for one or more components, such as the communication device 150. The bike communication system utilizes one or more physical or mechanical components of the electric bicycle 100 as an antenna via which the communication device 150 can transmit and/or receive information.

For example, the bike communication system can utilize a face plate, a seat post clamp, a crankset, or other mechanical components of the bicycle 100 as an antenna that connects to the communication device 150. By incorporating these components as part of the bike communication system, a provider of the electric bicycle 100, such as a fleet manager or ride share service, can prevent the tampering or removal of the communication capabilities of the bicycle 100, because the bicycle 100 cannot operate (e.g., cannot move or be pedaled) without these components. Thus, the bike communication system can integrate such components in order to resist and/or prevent tampering or removal of the bike communication system.

Figure 4:
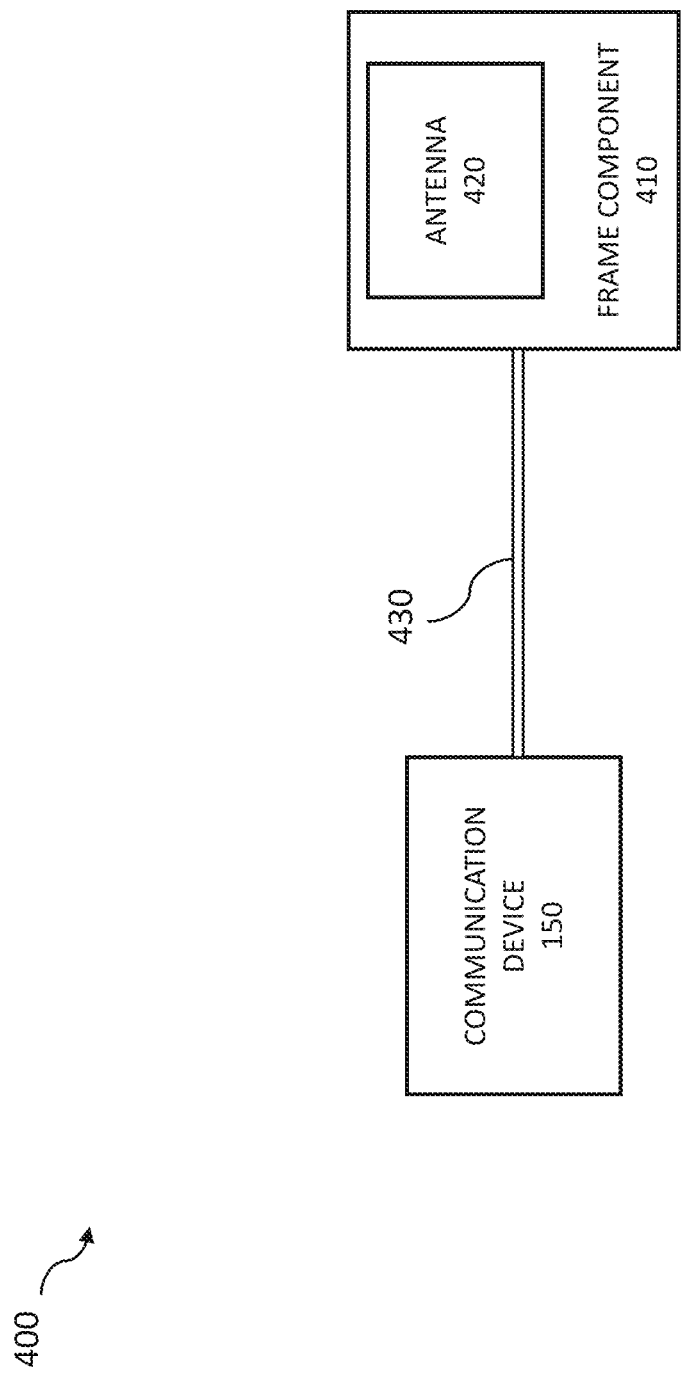
FIG. 4 is a block diagram illustrating example components of a bike communication system.

FIG. 4 is a block diagram illustrating example components of a bike communication system 400. The bike communication system 400 includes the communication device 150, or another device configured to transmit and/or receive information to/from the network 170.

As described herein, the communication device 150 can be positioned or fixed to the frame of the bicycle 100, such as to a head tube, top tube, down tube, seat tube, and so on. In some cases, the communication device 150 can be partially or fully disposed or contained within the frame, such as within the top tube or down tube.

The bike communication system 400 also includes a mechanical component 410 or frame component of the electric bicycle 100. The mechanical component 410 includes or incorporates an antenna 420. For example, the mechanical component 410 or frame component can include a stamped antenna, a plate, a printed antenna (e.g., a microstrip patch antenna), a coil, and so on. The antenna 420, in some cases, is a metal foil or metal plate configured to be attached or integrated (e.g., partially or wholly) into the mechanical component 410.

The bike communication system 400 includes a connection component 430, such as a wire or metal connector, that connects or couples the communication device 150 to the antenna 420 via the mechanical component 410 of the electric bicycle 100. In some cases, the connection component 430 is a printed metal strip or connector that runs within the frame of the bicycle 100 between the communication device 150 and the antenna 420. In other cases, the connection component 430 is disposed on or outside of the frame and runs between the communication device 150 and the antenna 420.

The communication system 400, therefore, can facilitate a method for establishing an electric bicycle as an Internet of Things (IoT) on a network, by fixing a frame plate (or other frame or mechanical component) to a frame of the electric bicycle, where the frame plate includes an antenna that connects the electric bicycle to the network and causing a network communication device of the electric bicycle to transmit information to the network via the antenna of the frame plate of the electric bicycle.

Figure 5A:
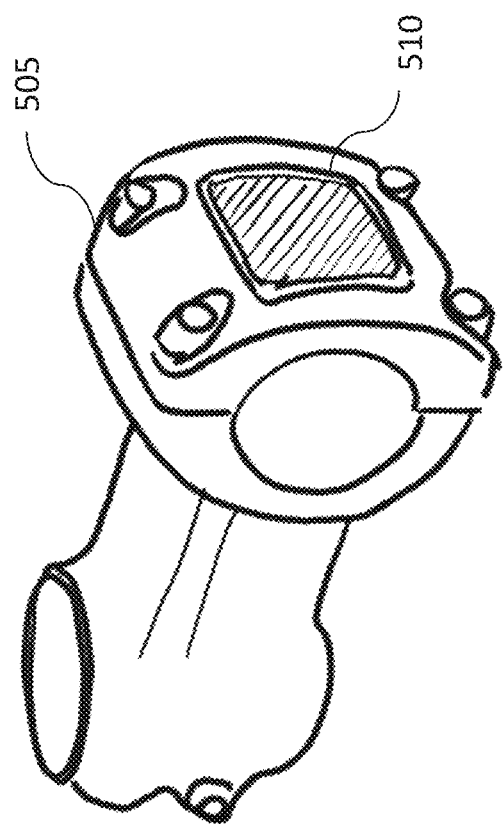
FIGS. 5A-5D are diagrams illustrating example bike components as antennas of a bike communication system.
Figure 5B:
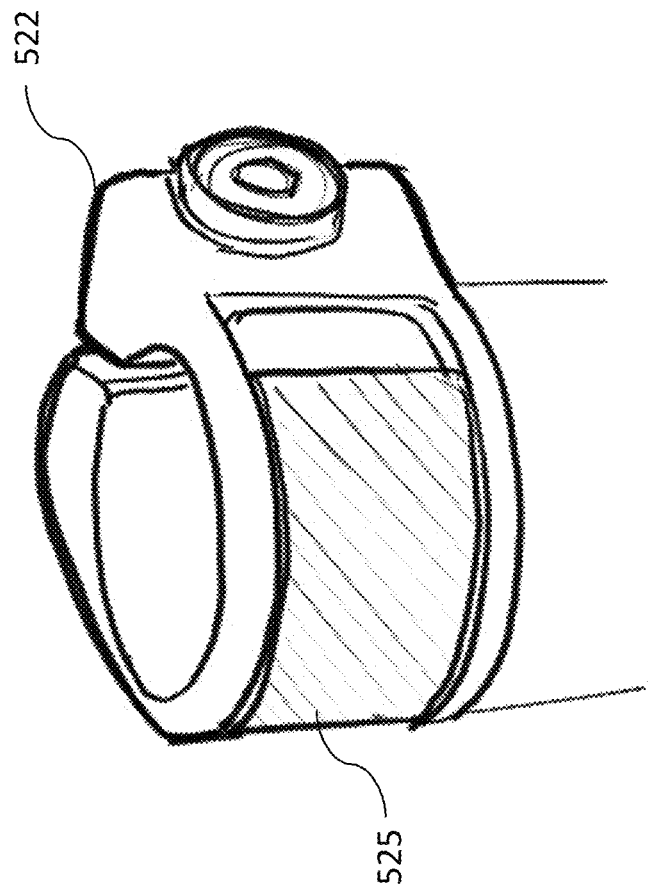
Figure 5C:
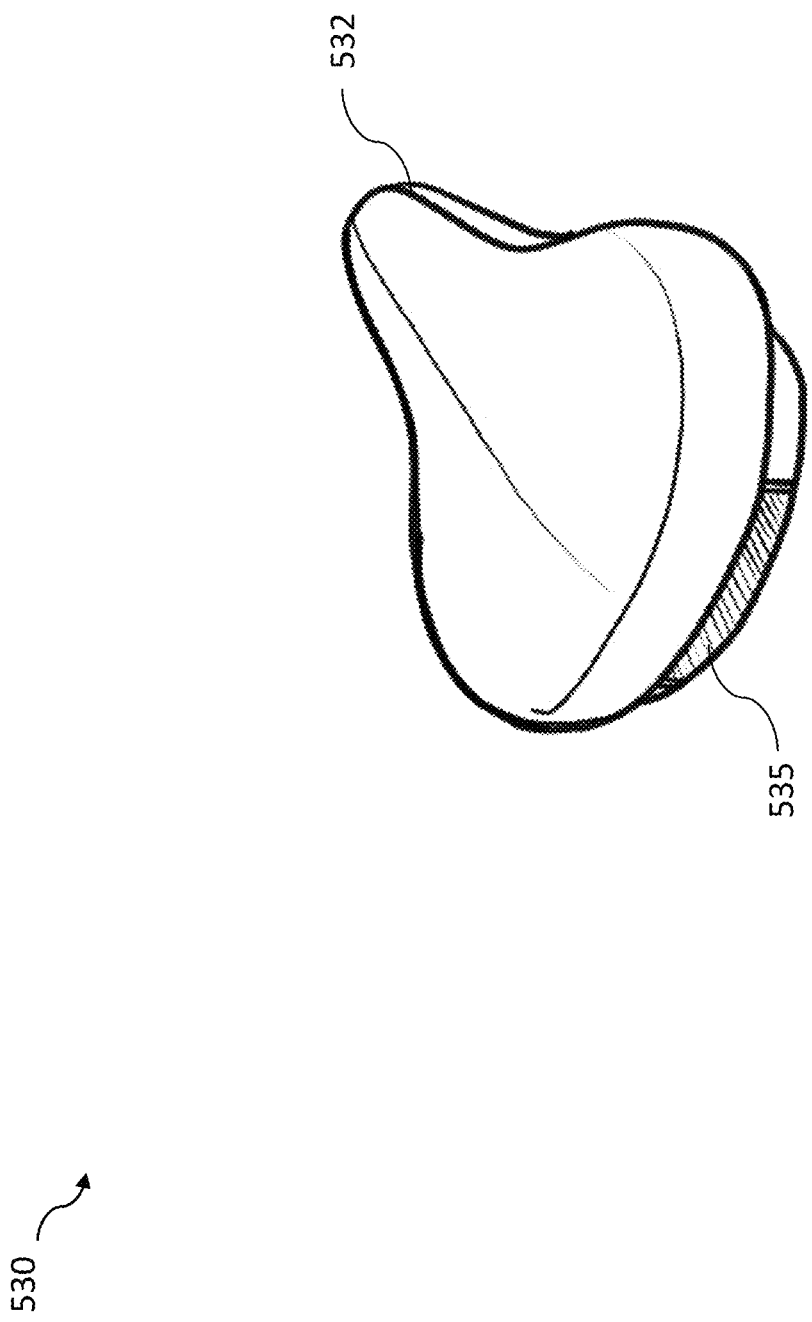

As described herein, the bike communication system 400 can be implemented utilizing a variety of different mechanical components of the electric bicycle 100. FIGS. 5A-5C are diagrams illustrating example bike components as antennas of the bike communication system 100.

As a first example, FIG. 5A depicts a bike communication system 500 that utilizes a face plate 505 to communicate over a network, such as the network 170. The communication device 150, disposed on or within the top tube of the electric bicycle 100, utilizes an antenna 510 that is integrated within or placed onto a surface of the face plate 505 (e.g., the removable plate that connects the stem to the handlebars). The communication device 150 can connect to the face plate 505 and/or antenna 510 using a wired or printed metal connector, disposed along or within the top tube of the bicycle 100. For example, the metal connector can run within the top tube (e.g., internally) from the communication device 150 to the antenna 510 of the face plate 505.

As a second example, FIG. 5B depicts a bike communication system 520 that utilizes a seat post clamp 522 to communicate over the network 170. The communication device 150, disposed on or within the top tube of the electric bicycle 100, utilizes an antenna 525 that is integrated within or placed onto a surface of the seat post clamp 522 (e.g., an attachment mechanism that fixes a seat post and associated seat to the bicycle 100). The communication device 150 can connect to the seat post clamp 522 and/or antenna 525 using a wired or printed metal connector, disposed along or within the top tube and seat tube of the bicycle 100.

For example, the metal connector can run within the top tube (e.g., internally) and seat tube from the communication device 150 to the antenna 525 of the seat post clamp 522. However, in other cases, the communication device 150 can be disposed on or within the seat tube, and the metal connector can run within the seat tube (e.g., internally) from the communication device 150 to the antenna 525 of the seat post clamp 522.

As another example, FIG. 5C depicts a bike communication system 530 that utilizes a bike seat 530 to communicate over the network 170. The communication device 150, disposed on or within the top tube of the electric bicycle 100, utilizes an antenna 535 that is integrated within or placed onto a surface of the bike seat 532. The communication device 150 can connect to the antenna 535 of the bike seat 532 using a wired or printed metal connector, disposed along or within the top tube and seat tube of the bicycle 100.

For example, the metal connector can run within the top tube (e.g., internally) and seat tube from the communication device 150 to the antenna 535 of the bike seat 532. However, in other cases, the communication device 150 can be disposed on or within the down tube, and the metal connector can run within the seat tube (e.g., internally) from the communication device 150 to the antenna 535 of the bike seat 532.

Figure 5D:
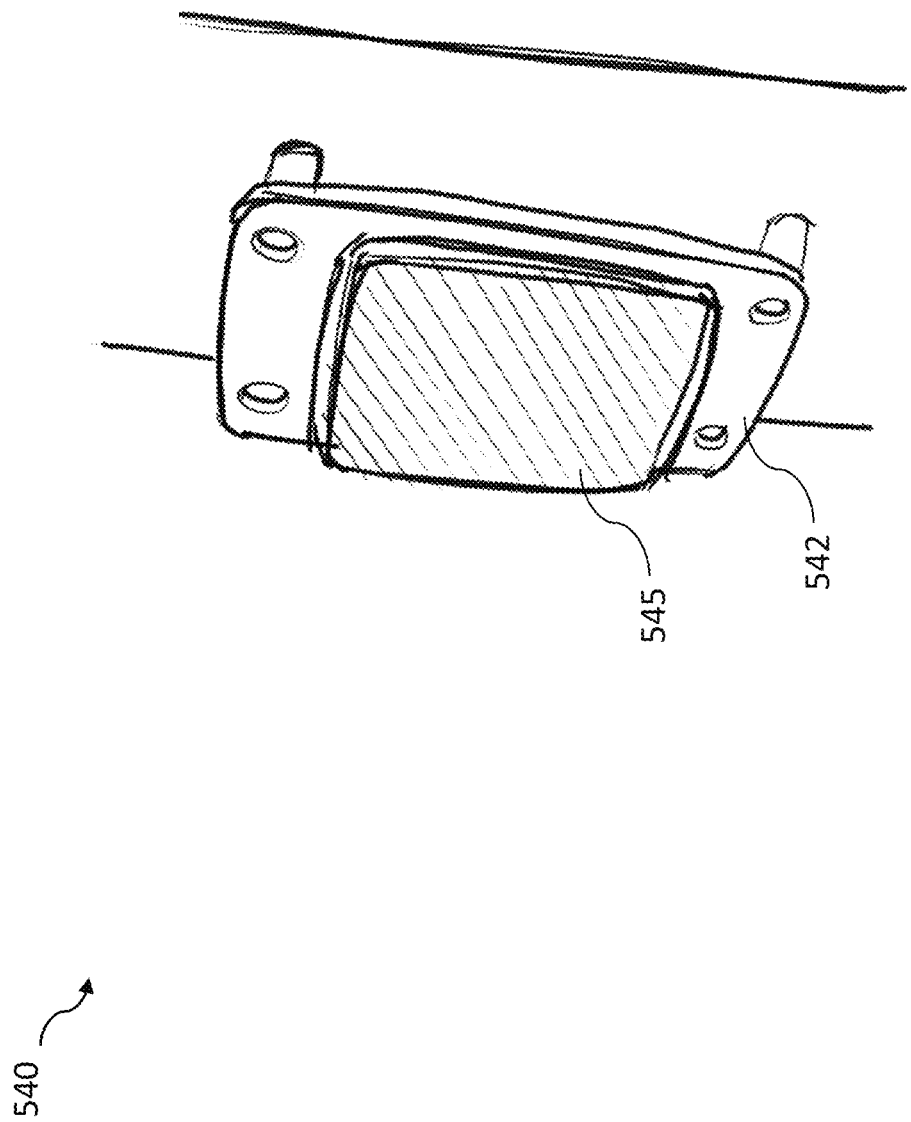

As another example, FIG. 5D depicts a bike communication system 540 that utilizes a front plate 542 to communicate over the network 170. The communication device 150, disposed on or within the top tube of the electric bicycle 100, utilizes an antenna 545 that is integrated within or placed onto a surface of the front plate 542. The communication device 150 can connect to the antenna 545 of the bike seat 542 using a wired or printed metal connector, disposed along or within the top tube and a head tube of the bicycle 100.

In addition to the front plate 542, an antenna can be integrated onto various frame plates that attach to the frame (e.g., on a rear rack or seat stay) of the electric bicycle 100. The frame plates, being flush with the frame, can enable the antenna to be easily installed or removed from the electric bicycle 100, and thus enable the activation or deactivation of the bicycle 100 as an IoT device or communication device. Thus, a retailer, fleet operator, bike share service, or other provider of the bicycle, can provide an electric bicycle 100 with or without network communication functionality, as well as provide an aftermarket IoT device that can easily be installed to the frame.

Of course, the bike communication system 400 can utilize other mechanical components of the electric bicycle 100 to contain or be part of the antenna 420, such as components located at various endpoints of the bicycle 100 and/or at positions that provide clear, unobstructed communication paths between the placed antennas and the network 170. Example mechanical or frame components 410 include:

A crank set, such as a crank arm, bottom bracket, and/or one or more chainrings of the crankset;

Handlebars, such as the ends of handlebars;

Rear racks and other accessories attached to a rear portion of the electric bicycle 100;

A wiring harness or other electric components of the electric bicycle 100;

Safety flags or posts of safety flags; and so on.

Thus, in some embodiments, utilizing a mechanical component of the electric bicycle 100 enables the communication device 150 to receive/transmit information from/to the bicycle 100 from a position of the electric bicycle 100 that is unobstructed from other components of the electric bicycle 100, among other benefits. Further, by utilizing mechanical components, the bike communication system 400 can prevent or deter tampering or avoiding the communication capabilities of the bicycle 100, because removal of or tampering to the antenna can cause the bicycle 100 to be inoperable, among other benefits.

Examples of Performing Security Actions for an Electric Bicycle

Figure 6:
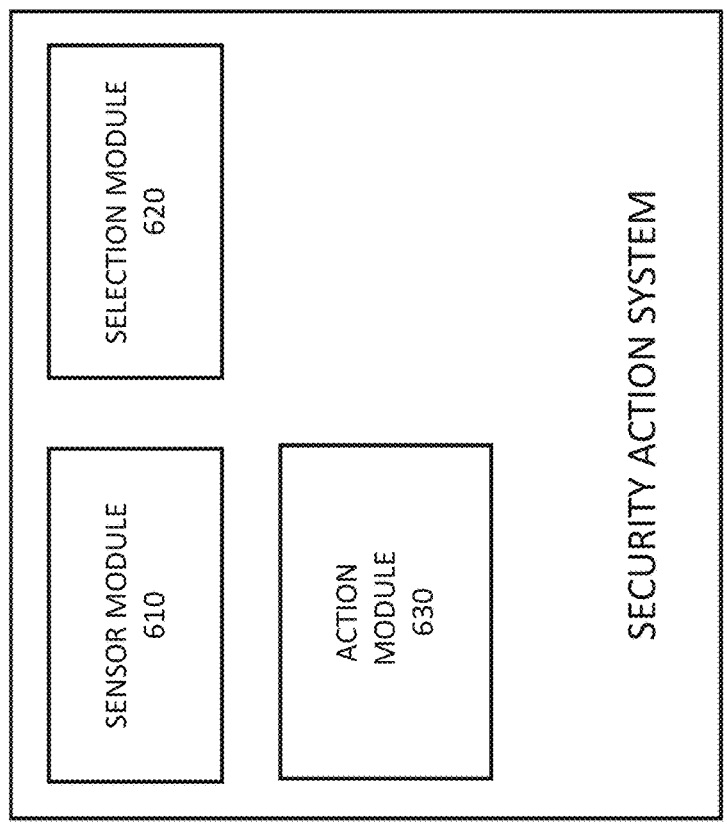
FIG. 6 is a block diagram illustrating example components of a security action system.

As described herein, in some embodiments, the systems and methods provide various techniques for identifying, selecting, and/or performing security actions for an electric bicycle. FIG. 6 is a block diagram illustrating example components or modules of a security action system 600.

The modules can be implemented with a combination of software (e.g., executable instructions, or computer code) and hardware (e.g., at least a memory and processor). Accordingly, as used herein, in some example embodiments, a module is a processor-implemented module and represents a computing device having a processor that is at least temporarily configured and/or programmed by executable instructions stored in memory to perform one or more of the particular functions that are described herein. The security action system 600 includes a sensor module 610, a selection module 620, and an action module 630.

In some embodiments, the sensor module 610 is configured and/or programmed to receive or access information captured by one of more sensors of the electric bicycle 610. For example, the sensor module 610 can receive information from different sensors fixed or attached to the electric bicycle 100, including sensors configured or implemented to capture movement information for the electric bicycle 100, status information for one or more components of the electric bicycle 100, location information for the electric bicycle 100, environmental information for the location through which the electric bicycle 100 is traveling, and so on. Further details regarding the types of sensors and the information captured by the sensors is described herein.

In some embodiments, the selection module 620 is configured and/or programmed to apply one or more rules to the received information. For example, the selection module 620 can access one or more stored rules or instructions that set forth processes for determining whether to perform a safety action at a given time. The rules or instructions, in some cases, identify an action to perform in response to certain information, or patterns of information, captured by the sensors and provided to the sensor module 610.

For example, the selection module 620 can apply one or more of the following rules to received sensor information:

In some embodiments, the action module 630 is configured and/or programmed to select or determine a security action to perform by the electric bicycle 100 and/or by one or more components (e.g., a horn or alarm, a motor, a controller) of the electric bicycle 100. For example, the action module 630 determines one or more actions based on the rules applied by the selection module 620.

Example actions can include: sending an alert to a rider or owner of the electric bicycle 100, sending an alert to a security service or fleet manager associated with monitoring the electric bicycle 100, causing the electric bicycle 100 to initiate an alarm (e.g., an audible or visible alarm), shutting down one or more components of the electric bicycle 100 (e.g., shutting down the battery 110, controller 120, and/or motor 130 of the electric bicycle 100), locking one or more components of the electric bicycle (e.g., causing the lock 140 or 145 to secure the real wheel, locking movement of the fork or front wheel of the electric bicycle 100), and other actions that deter or prevent movement, theft, or tampering of the electric bicycle 100 and/or various components.

As described herein, the systems and methods utilize combinations of input data or information when selecting and determining the actions to perform for the electric bicycle 100 and/or its rider/user. By performing actions based on certain combinations of data/information, the systems and methods can avoid false alarms or erroneous determinations that can occur within conventional systems.

In some cases, the bike supported network, which enables communications between different systems, devices, and/or components, enables actions to be selected and/or determined based on multiple inputs and associated input combinations. In doing so, the systems and methods facilitate and provide an enhanced and robust alert and alarm system that performs actions tailored to theft or tampering events associated with the electric bicycle 100, among other benefits.

Figure 7:
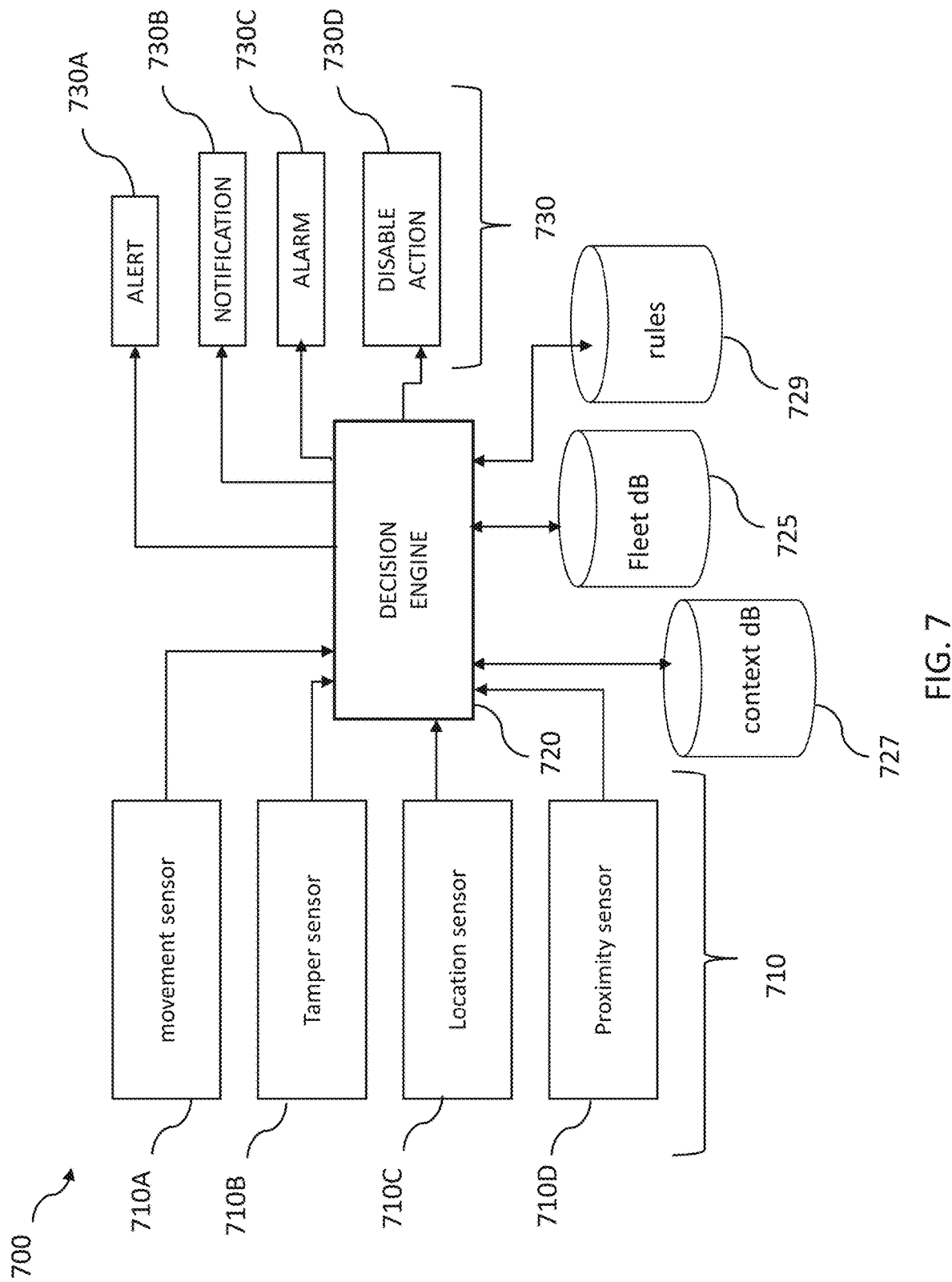
FIG. 7 is a block diagram illustrating various components of a multi-factor alert system.

FIG. 7 is a block diagram illustrating various components of a multi-factor alert system 700. The multi-factor alert system 700 includes various sensors 710, which capture information about the electric bicycle 100 and/or components of the electric bicycle 100. The sensors can be deployed at various positions on the electric bicycle 100, including within the controller 120, the security device 140, the motor 130, the battery 110, and various bicycle components or parts (e.g., the frame, the wheels, the tires, the handlebars, the fork, the pedals, and so on).

The sensors 710 can include one or more movement sensors 710A, which capture or measure information about the movement of the electric bicycle (e.g., speed, velocity, acceleration, orientation, and so on). For example, the movement sensors 710A can capture information that indicates the bicycle 100 is moving, the bicycle 100 is not moving, the bicycle 100 is moving at a certain speed or acceleration, the bicycle 100 is moving in a vertical direction, and so on.

The sensors 710 can also include one or more tamper sensors 710B, which capture or measure information that indicates a component of the bicycle 100 has been tampered with or is otherwise inoperable. For example, the tamper sensors 710B can capture information that indicates a wheel has been cut, a tire has been punctured, the lock 145 has been tampered with, the battery 110 has been removed or partially removed, and so on.

The sensors 710 can also include one or more location sensors 710C, such as GPS sensors, which capture or measure a geographical location of the bicycle 100. Further, the sensors 710 can include one or more proximity sensors 710D, which capture or measure information that indicates whether the electric bicycle 100 is proximate to a paired or associated device (e.g., a mobile device of a user, a charger associated with the bicycle 100, a bike rack or other location where the bicycle 100 is secured, and so on). Of course, the sensors 710 can include other sensors configured to capture information about the electric bicycle 100 and/or the environment within which the bicycle 100 is located.

The multi-factor alert system 700 includes a decision engine 720, which is configured to determine and/or select one or more security actions to perform in response to input received from the sensors 710. The decision engine 720, which can include some or all of the modules of the security action system 600 described herein, can utilize multiple inputs from the sensors 710 when selection an action or actions to perform.

Further, the decision engine 720 can utilize information stored in one or more databases when determining actions. The decision engine 720 can access information stored in a fleet database 725, such as information that identifies a fleet or group of bicycles associated with the electric bicycle 100. The fleet database 725 can store information that identifies the fleet or owner of the fleet, information that tracks locations of other bicycles within the fleet, and so on.

The decision engine 720 can also access a context database 727, which stores information associated with a current or predicted context for the electric bicycle 100. For example, the context database 727 can store information identifying the rider of the bicycle 100, the owner of the bicycle 100, the current route of the bicycle 100, a predicted or known route for the bicycle 100, a history of locations/routes traveled by the bicycle 100, and so on.

The decision engine 720 also access one or more rules from a rules database 729. The rules database 729 can include rules to be applied to input received from the sensors 710 when the decision engine 720 determines an action or actions to perform. For example, the rules database 729 stores some or all of the rules described herein.

In some embodiments, the decision engine 720 and the databases 725, 727, 729 (and/or security action system 600) are located within the controller 120 and/or lock 145 that acts as a hub for the bike supported network. However, aspects can also reside at various locations remote from the bicycle 100, such as at the security system of the remote server 310, the fleet management system 330, and/or the mobile application 325 depicted in FIG. 3.

Referring back to FIG. 7, the decision engine 720 can select or determine one or more actions 730 to perform on behalf of the bicycle 100. For example, the decision engine 720 can select or determine an alert 730A to send to an owner of the bicycle 100, can select or determine a notification or message 730B to send to the owner of the bicycle 100, can select or determine an alarm to be performed by the bicycle 730C, and/or select or determine a disable action 730D, which causes one or more components of the bicycle 100 to be disabled and stop operating.

Figure 8:
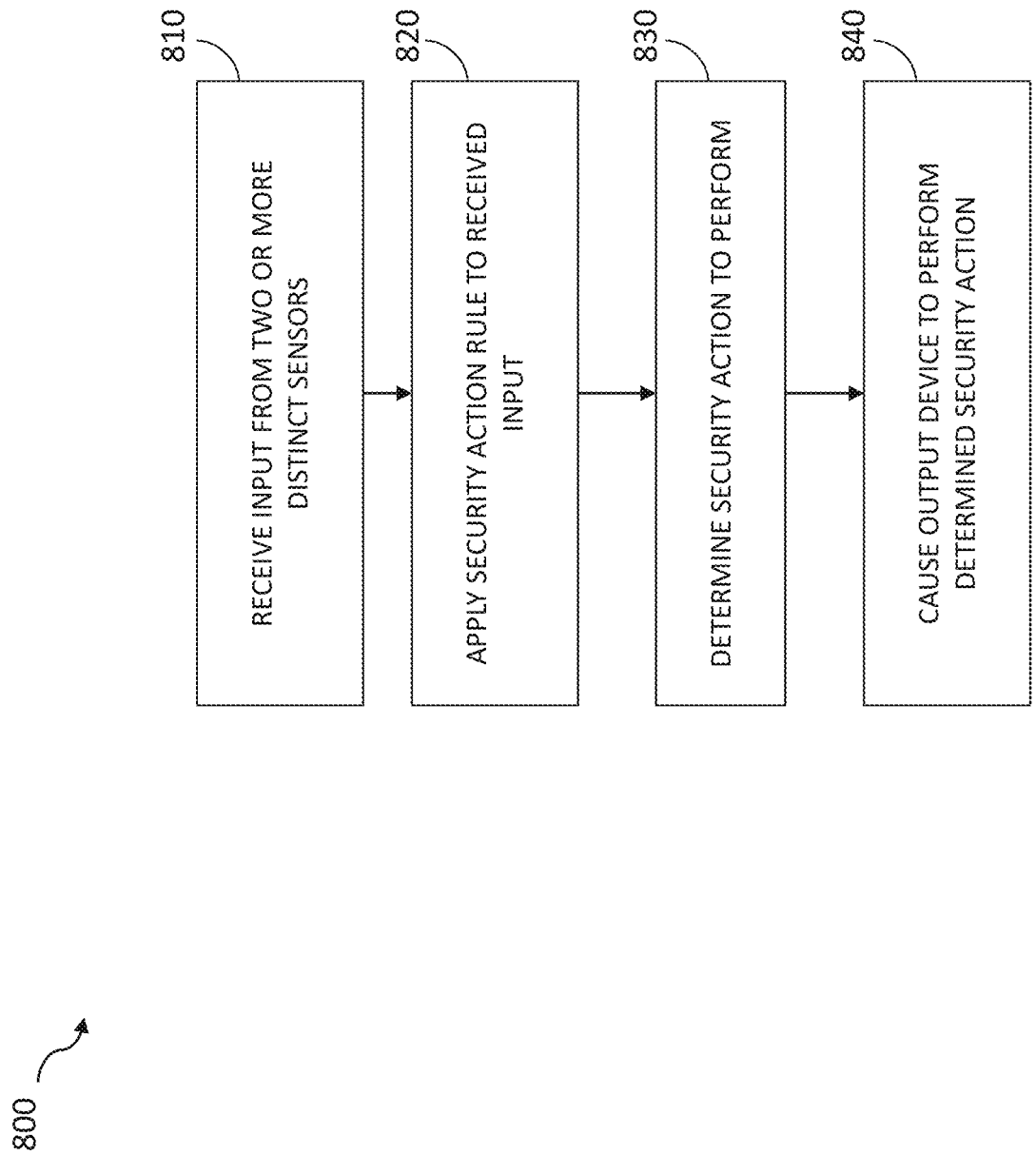
FIG. 8 is a flow diagram illustrating an example method of presenting a security action for an electric bicycle.

Thus, the security action system 600 and/or the decision engine 720 of the multi-factor alert system 700 perform various processes or methods when determining an action or actions to perform. FIG. 8 is a flow diagram illustrating an example method 800 of presenting a security action for an electric bicycle. The method 800 may be performed by the system 600 or system 700 and, accordingly, is described herein merely by way of reference thereto. It will be appreciated that the method 800 may be performed on any suitable hardware.

In operation 810, the system 600 receives input from two or more distinct or disparate sensors. For example, the system 600 receives input from two or more sensors 710. Example input can include information that identifies the bicycle 100 is moving, information that identifies the bicycle 100 is within a certain location or geographical area, information that identifies a component of the bicycle 100 has been tampered with or is no longer operable, information that identifies the bicycle 100 is no longer proximate to an associated device, information that identifies the type of unlocking protocol, and so on.

In operation 820, the system 600 applies one or more rules to the input received from the sensors 710. For example, the system 600 can apply one or more rules stored in the rules database 729, such as rules that select certain actions to be performed. Example rules to be applied include:
- If bike is moving, the back wheel is not rotating, and one or more components have sent a tamper signal, cause alarm to be performed;
- If wheels are rotating and one or more components have sent a tamper signal, disable operation of motor or controller;
- If bike is moving and the back wheel is not rotating, cause alarm to be performed;
- If bike is not moving and one or more components have sent a tamper signal, cause alarm to be performed;
- If bike is not moving and bike is not proximate to a paired device, sent a notification to the fleet manager; and so on.

Thus, the rules include combinations (e.g., two or more inputs from sensors 710) that map or relate to one of multiple actions to perform for the bicycle 100.

In operation 830, the system 600 determines the security action to perform for the bicycle 100. For example, after applying one or more selected rules, the system 600 selects a security action identified by the rule to be performed.

In operation 840, the system 600 causes an output device to perform the determined security action. For example, the system 600 can cause a horn to be initiated, an alarm to be performed, a motor to be disabled, a controller or battery to be disabled, a message, notification, or alert to be sent, and so on.

Figure 9:
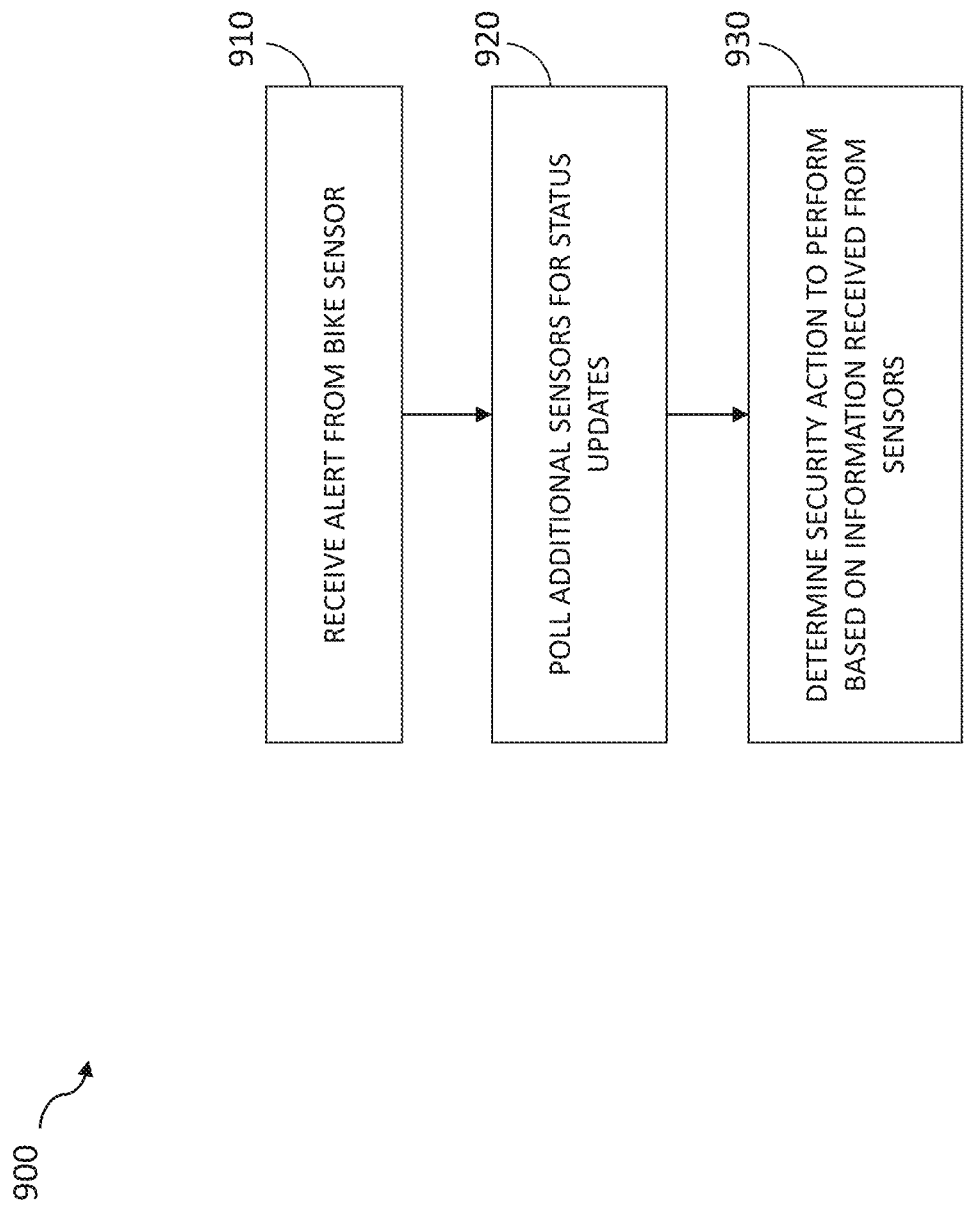
FIG. 9 is a flow diagram illustrating an example method of determining a security action for an electric bicycle using information from various bicycle sensors.

In some embodiments, the system 600 or system 700 can determine an action to perform by actively retrieving or otherwise accessing information from the sensors 710 or other bike components in response to an initial received input. FIG. 9 is a flow diagram illustrating an example method 900 of determining a security action for an electric bicycle using information from various bicycle sensors. The method 900 may be performed by the system 600 or system 700 and, accordingly, is described herein merely by way of reference thereto. It will be appreciated that the method 900 may be performed on any suitable hardware.

In operation 910, the system 600 receives an alert or other input from a bike sensor, such as one or more sensors 710. For example, the system 600 (or system 700) receives a tamper signal from one or more of the tamper sensors 710B, and/or movement information from one or more of the movement sensors 710A.

In operation 920, the system 600 polls additional sensors for status updates associated with the electric bicycle 100 and its components. For example, the system 600 can poll or otherwise request information from other sensors 710, such as sensors 710 that measure the movement or location of the bicycle 100. In some cases, the system 600 can request information from other components, such as the controller 120, the lock 145, the motor 130, the battery 110, and so on.

In operation 930, the system 600 determines a security action to perform based on the information received from the sensors (or other components). For example, the system can select one or more actions 730 to perform based on the information retrieved when polling the sensors and/or bike components.

The following example scenario illustrates selecting a security action based on a polling of sensors or bike components. The movement sensor 710A measures movement of the back wheel, and sends an alert to the decision engine 720 that indicates movement of the back wheel. The decision engine 720 polls both the location sensor 710C and the proximity sensor 710D for additional information. The decision engine 720 receives location information that indicates the bicycle is still within the same geographical location. Based on this information, the decision engine 720 selects an action to perform that sends a notification to the user of the electric bicycle 100.

The following is another example scenario—the decision engine 720 receives the information indicating the movement of the back wheel, and polls the controller 120 for a status update. The controller 120 sends information indicating that the rider of the bicycle has attempted to use the throttle of the bicycle 100. Based on this information, the decision engine 720 selects an action to perform that disables operation of the motor 130 of the bicycle 100, and then sends an alert to the user of the bicycle 100.

Figure 10:
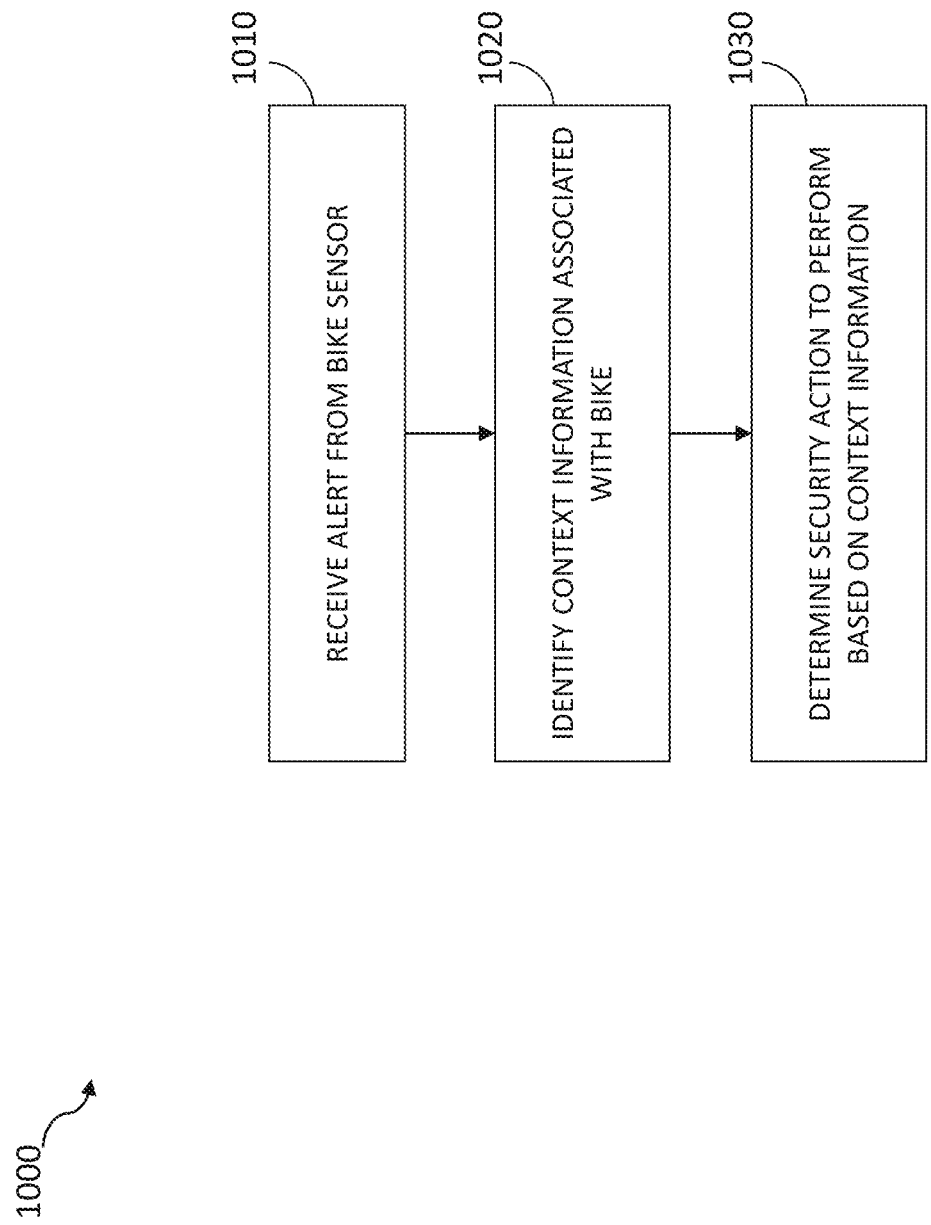
FIG. 10 is a flow diagram illustrating an example method of determining a security action for an electric bicycle based on a context associated with the electric bicycle.

In some embodiments, the system 600 or system 700 can determine an action to perform based on a known or predicted context for or associated with the electric bicycle 100. FIG. 10 is a flow diagram illustrating an example method 1000 of determining a security action for an electric bicycle based on a context associated with the electric bicycle. The method 1000 may be performed by the system 600 or system 700 and, accordingly, is described herein merely by way of reference thereto. It will be appreciated that the method 1000 may be performed on any suitable hardware.

In operation 1010, the system 600 receives an alert or other input from a bike sensor, such as one or more sensors 710. For example, the system 600 (or system 700) receives a tamper signal from one or more of the tamper sensors 710B, and/or movement information from one or more of the movement sensors 710A.

In operation 1020, the system 600 identifies context information associated with the electric bicycle 100. For example, the system 600 accesses information stored in the context database 727, such as information associated with a location of the bicycle 100. The location information can identify a current geographical location of the bicycle 100, a type of location (e.g., city street, bike path, bike rack area, office complex, campus, and so on) where the bike is located, the safety information for the current geographical location of the bicycle 100.

The safety information can indicate a variety of different safety factors for the location. Example safety factors include:
- a historical safety rating for the location (e.g., 1 to 5, or a binary rating of "safe" versus "unsafe");
- a current or trending safety rating for the location (e.g., trending towards unsafe, or safe over the past month);
- whether the location is part of a historical or recent hotspot for thefts or tampering of bicycle or other vehicles;
- information identifying specific theft/tampering actions at the location (e.g., more than X locks were cut at the location over the past Y days, or more than X electric bikes were stolen from the location over the past Y days);
- information identifying specific theft/tampering actions at locations proximate to the location; and so on.

In addition, the context information can indicate the mechanism used to lock the bicycle 100. For example, the user may have locked the bicycle 100 via a remote application, via a biometric (e.g., thumbprint or voice command) action, via a device paired to the mount 165 of the bicycle 165, via a mechanical action, and so on.

In operation 1030, the system 600 determines a security action to perform based on the context information. For example, the system 600 can select one or more actions 730 to perform based on applying the context information to the alert received from the bike sensor.

As a first example that illustrates the use of context information when determining an action to perform, the movement sensor 710A sends an alert that the bicycle 100 is moving at a relatively constant speed. The decision engine 720 accesses the context database 727 and retrieves information that indicates the bicycle 100 is proximate to a charger at a campus location, and causes a notification to be sent to the user of the bicycle 100.

As a second example, the decision engine 720 receive the movement information and sends a request for context information. The context information indicates the bicycle 100 is in a new location tagged as "high theft." Based on the context information, the decision engine 720 causes an alarm to be sounds at the bicycle, and sends an alert to a fleet manager associated with the bicycle 100.

As a third example, the decision engine 720 receives information from the tamper sensor 710B that indicates the battery 110 is moving (e.g., possibly indicating that someone is trying to steal the battery 110). The decision engine 720 determines, based on the context information, that there has been a 200% increase in battery thefts in the area in the past month, and causes the bicycle 100 to sound an alarm at the bicycle 100 (or, in some cases, cause the battery to be inoperable).

As a fourth example, the tamper sensor 710B sends an alert that a wheel lock of the bicycle has been mechanically unlocked via a key mechanism. The decision engine 720 accesses the context database 727 and retrieves information that indicates the bicycle 100 was locked via a biometric input (e.g., a thumbprint), and based on a mismatch of lock/unlock mechanisms, sends an alert to the user of the bicycle (and, optionally, sounds an alarm at the bicycle 100).

Thus, the system 600 and/or system 700 can utilize various types of information when selecting and/or determining actions to perform in response to possible or detected theft/tampering activities at the bicycle 100. In doing so, the systems 600, 700 seek to determine an accurate picture of the actual activity at the bicycle 100, in order to determine which of the various actions to perform.

For example, while the movement of a bicycle can indicate an attempted theft of the bicycle, it can also indicate that the bicycle is being moved to make room for another bicycle at a bike rack or charger, or is being moved for other innocuous purposes. Further, while a tampering signal will often indicate someone is trying to steal the bicycle, the bicycle may be accidentally knocked over or bumped into. Thus, the systems and methods seek to discern nefarious events from the innocent/accidental events at the bicycle, and perform actions appropriate to such events, among other benefits.

Examples of Retrofitting a Mechanical Lock

Figure 11:
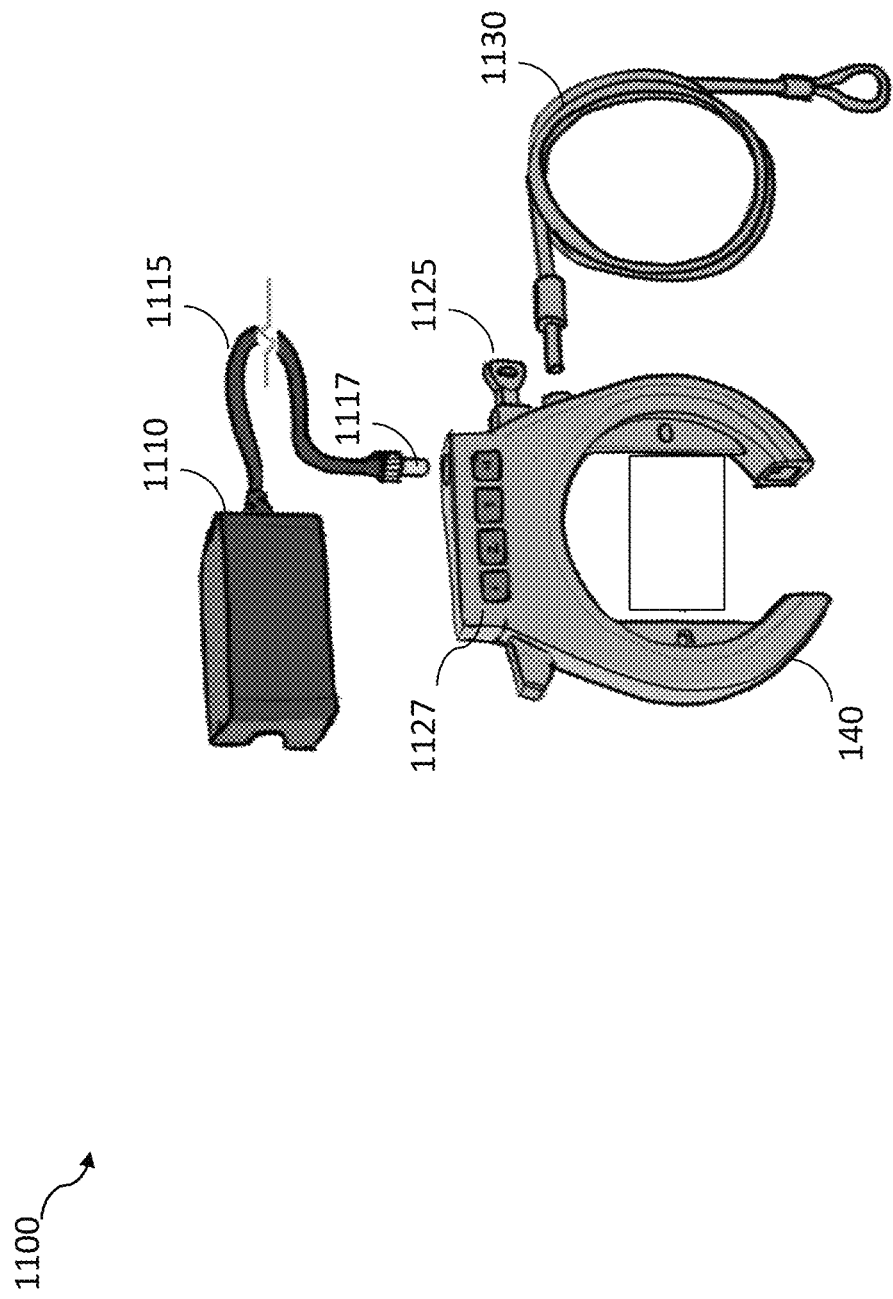
FIG. 11 is a diagram illustrating a lock module configured to be adapted with a conventional lock.

As described herein, in some embodiments, the systems and methods are configured to work with conventional mechanical locks, such as wheel or shackle locks that operate to prevent movement of the back wheel of a bicycle. For example, the lock 145, which acts as a communication hub for the electric bicycle 100, can be retrofitted and incorporated into a conventional lock. FIG. 11 is a diagram illustrating a configuration 1100 of a lock module 1110 configured to be adapted with a conventional lock, such as the lock 140.

The lock 140 includes mechanical unlock/lock components, such as a key lock mechanism 1125 and a combination lock mechanism 1127. Further, the lock 140 can include a second locking mechanism, such as an integrated cable 1130 lock. Further details regarding the integrated locking mechanism are found in related U.S. patent application Ser. No. 16/875,874, filed on May 15, 2020, entitled BICYCLE SECURITY DEVICES AND SYSTEM, which is incorporated by reference in its entirety.

The lock module 1110 can connect or otherwise be coupled to the lock 140 via a cable 1115 and connector 1117. The lock module 1110, which can include the components described herein with respect to lock 145 and/or lock 200, enables operation of the lock 140 via the bike supported network and its various components. Thus, the lock module, connected to the bike network, enables the lock to be operated (e.g., locked or unlocked) via input received at the associated mobile application 325 and/or via the display device 160 or other bike control input devices.

Figure 12:
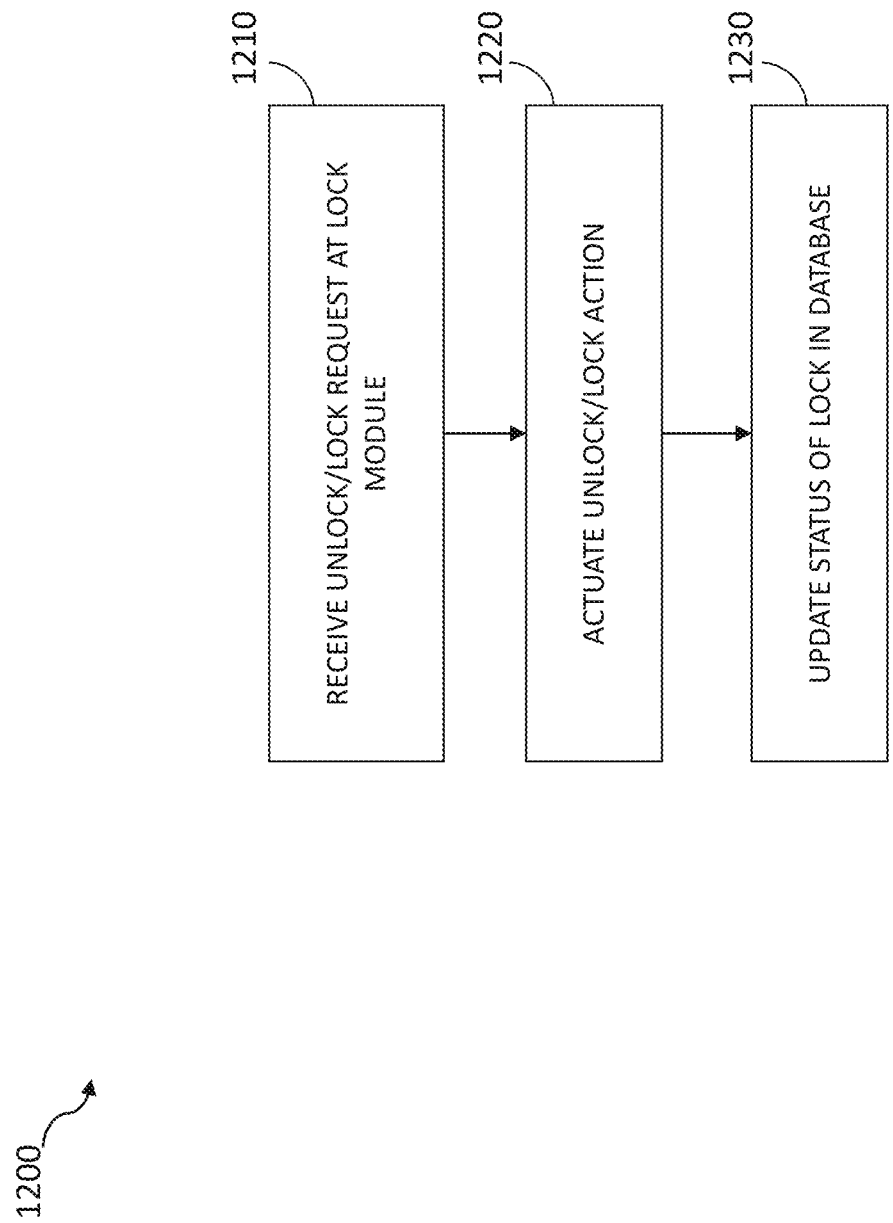
FIG. 12 is a flow diagram illustrating an example method of unlocking a conventional lock using an associated lock module.

FIG. 12 is a flow diagram illustrating an example method 1200 of unlocking the conventional lock 140 using the associated lock module 1110. The method 1000 may be performed by the lock module 1110 and, accordingly, is described herein merely by way of reference thereto. It will be appreciated that the method 1200 may be performed on any suitable hardware.

In operation 1210, the lock module 1110 receives a lock/unlock request from a user of the bicycle 100. For example, the user can provide input via an associated application (e.g., mobile application 325), which is paired to the lock module 1110 over Bluetooth or other communication protocols.

In operation 1220, the lock module 1110 causes the lock 140 to actuate a lock/unlock action. For example, via the cable 1115 and connection 1117, the lock module causes a motor within the lock 140 to turn on, rotating the shackle or rotating arm to lock or unlock the wheel. As another example, the lock module 1110 can cause a spring or other mechanically-actuated mechanism of the lock 140 to release the shackle or rotating arm to lock or unlock the wheel.

In operation 1230, the lock module 1110 updates a status of the lock 140 in a database. For example, the lock module 1110, after performing an action to lock or unlock the lock 140, causes one or more databases to update information associated with a current status (e.g., locked or unlocked) of the lock 140. Such information can be utilized by the various systems (e.g., systems 600, 700) when determining security actions to perform for the bicycle 100.

Thus, in some embodiments, the systems and methods can retrofit existing locks (e.g., wheel locks) to be part of the bike supported network and/or to communicate with various remote locking systems and other security systems, among other benefits.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or", in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the electric bike and bike frame may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

From the foregoing, it will be appreciated that specific embodiments have been described herein for purposes of illustration, but that various modifications may be made without deviating from the spirit and scope of the embodiments. Accordingly, the embodiments are not limited except as by the appended claims.

What is claimed is:

1. An electric bicycle, comprising:
    a frame having a head tube, down tube, top tube, and seat tube;
    a front wheel attached to the frame via a fork connected to the head tube;
    a rear wheel attached to the frame via a dropout assembly of the frame;
    an electric motor mounted to the rear wheel that causes the rear wheel to rotate;
    a battery pack mounted to the frame of the electric bicycle that provides power to the electric motor;
    a controller that controls operations of the battery pack of the electric bicycle and the electric motor of the electric bicycle; and
    a lock assembly that is configured to lock the rear wheel of the electric bicycle, wherein the lock assembly includes:
        a communication device that communicates with a wireless network via one or more wireless communication protocols,
            wherein the communication device is configured to manage communications between the wireless network and the controller of the electric bicycle; and
        a fleet module, separate from the communication device, that communicates directly with a fleet management server, wherein the fleet management server is associated with a fleet of electric bicycles that includes the electric bicycle.

2. The electric bicycle of claim 1, wherein the lock assembly further comprises:
a lock component that includes a mechanically-actuated shackle lock that prevents the rear wheel of the electric bicycle from rotating.

3. The electric bicycle of claim 1, wherein the lock assembly further comprises:
a lock component that includes an electronically-actuated shackle lock that prevents the rear wheel of the electric bicycle from rotating.

4. The electric bicycle of claim 1, wherein the lock assembly further comprises:
a lock component that includes an integrated cable lock that is configured to fix the electric bicycle to a fixture at a geographical location that includes the electric bicycle.

5. The electric bicycle of claim 1, wherein the lock assembly further comprises:
a lock component that includes an electronic locking module that causes the electric motor, the battery park, or the controller to operate in a locked mode of operation.

6. The electric bicycle of claim 1, wherein the lock assembly further comprises:
a housing that secures the lock assembly to the seat tube of the frame of the electric bicycle and contains the communication device.

7. The electric bicycle of claim 1, further comprising:
a display device that is mounted to handlebars of the electric bicycle;
wherein the communication device is configured to manage communications between the wireless network and the display device of the electric bicycle.

8. The electric bicycle of claim 1, wherein the communication device includes a transmitter configured to perform cellular communications over the wireless network.

9. The electric bicycle of claim 1, wherein the communication device is configured to represent the electric bicycle as an Internet of Things (IOT) device on the wireless network.

10. The electric bicycle of claim 1, wherein the communication device is adapted to communicate over the wireless network via an antenna integrated into one or more frame components of the electric bicycle.

11. The electric bicycle of claim 1, wherein the communication device includes:
a Bluetooth component that facilitates Bluetooth protocol communications between the communication device and the controller, battery pack, and electric motor; and
a wireless component that facilitates WiFi protocol communications between the communication device and the wireless network.

12. The electric bicycle of claim 1, wherein the communication device includes:
a Bluetooth component that facilitates Bluetooth protocol communications between the communication device and the controller, battery pack, and electric motor; and
a cellular component that facilitates cellular protocol communications between the communication device and the wireless network.

13. A lock assembly for an electric bicycle, the lock assembly comprising:
a lock component that is configured to;
lock a rear wheel of the electric bicycle, and
cause an electric motor, a battery park, or a controller of the electric bicycle to operate in a locked mode of operation; and
a communication device that communicates with a wireless network via one or more wireless communication protocols,
wherein the communication device is configured to manage communications between the wireless network and the controller of the electric bicycle.

14. The lock assembly of claim 13, wherein the lock component includes a mechanically-actuated shackle lock that prevents the rear wheel of the electric bicycle from rotating.

15. The lock assembly of claim 13, wherein the lock component includes an electronically-actuated shackle lock that prevents the rear wheel of the electric bicycle from rotating.

16. The lock assembly of claim 13, wherein the lock component includes an integrated cable lock that is configured to fix the electric bicycle to a fixture at a geographical location that includes the electric bicycle.

17. The lock assembly of claim 13, wherein the lock component includes an electronic locking module that causes the electric motor, the battery park, or the controller to operate in the locked mode of operation.

18. The lock assembly of claim 13, wherein the lock assembly further comprises:
a housing that secures the lock assembly to a seat tube of a frame of the electric bicycle and contains the communication device.

19. The lock assembly of claim 13, wherein the communication device includes:
a bicycle communications component that facilitates communications between the communication device and a controller, a battery pack, and an electric motor of the electric bicycle; and
a network communications component that facilitates communications between the electric bicycle and the wireless network.

20. A method, comprising:
receiving, via a communications device contained within a lock assembly of an electric bicycle, information associated with a current operation of a component of the electric bicycle over a Bluetooth communication protocol that manages communications between the communications device and the component of the electric bicycle,
wherein the current operation of the component of the electric bicycle includes a current operation of a battery pack or electric motor of the electric bicycle; and
transmitting, via the communication device contained within the lock assembly of the electric bicycle, a message to a bicycle management server that is remote from the electric bicycle over a wireless network,
wherein the message includes the information associated with the current operation of the component of the electric bicycle.

* * * * *